(12) United States Patent
Liu et al.

(10) Patent No.: US 12,155,990 B2
(45) Date of Patent: Nov. 26, 2024

(54) BONE CONDUCTIVE SOUND GENERATING DEVICE

(71) Applicant: SHENZHEN SHOKZ CO., LTD., Shenzhen (CN)

(72) Inventors: Yinchao Liu, Shenzhen (CN); Haofeng Zhang, Shenzhen (CN); Lei Zhang, Shenzhen (CN); Yongjian Li, Shenzhen (CN); Yueqiang Wang, Shenzhen (CN); Qian Chen, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 156 days.

(21) Appl. No.: 17/696,911

(22) Filed: Mar. 17, 2022

(65) Prior Publication Data

US 2022/0210540 A1   Jun. 30, 2022

Related U.S. Application Data

(62) Division of application No. 16/924,122, filed on Jul. 8, 2020, now Pat. No. 11,310,584.

(51) Int. Cl.
*H04R 1/10* (2006.01)
*G02C 11/06* (2006.01)

(52) U.S. Cl.
CPC ........... *H04R 1/1091* (2013.01); *G02C 11/06* (2013.01); *H04R 2460/13* (2013.01)

(58) Field of Classification Search
CPC ...... H04R 1/10; H04R 1/1008; H04R 1/1016; H04R 1/105; H04R 1/1058; H04R 1/1066; H04R 1/1075; H04R 1/1091; H04R 5/00; H04R 5/033; H04R 5/0335; H04R 25/00; H04R 25/02; H04R 25/60; H04R 25/604; H04R 25/607; H04R 25/65; H04R 25/658;
(Continued)

(56) References Cited

U.S. PATENT DOCUMENTS 4,791,673 A    12/1988  Schreiber
6,099,117 A *   8/2000  Gregory ................. G02C 7/101
                                                351/153
(Continued)

FOREIGN PATENT DOCUMENTS

CN    103428601 A    12/2013
CN    204119448 U     1/2015
(Continued)

OTHER PUBLICATIONS

European Examination report,European Application No. 18898265.6, mailed Apr. 14, 2023 (7 pages).
(Continued)

*Primary Examiner* — Walter F Briney, III
(74) *Attorney, Agent, or Firm* — METIS IP LLC

(57) ABSTRACT

A bone conductive sound generating device is provided and includes a sound generating mechanism and a fixing mechanism. The fixing mechanism is configured to act on the sound generating mechanism, such that the sound generating mechanism adheres to and fit with a back of an auricle of a user at least when the sound generating mechanism is in use. Accordingly, the present application may improve the sound quality of the bone conductive sound generating device, improving listening experience for the user.

20 Claims, 14 Drawing Sheets

(58) Field of Classification Search
CPC ............ H04R 2201/00; H04R 2201/02; H04R 2201/023; H04R 2201/10; H04R 2201/105; H04R 2225/00; H04R 2225/021; H04R 2225/0213; H04R 2225/57; H04R 2225/77; H04R 2460/00; H04R 2460/13; G02C 5/00; G02C 5/001; G02C 5/14; G02C 5/143; G02C 5/146; G02C 5/20; G02C 5/22; G02C 5/2209; G02C 5/2218; G02C 5/2254; G02C 11/00; G02C 11/06
See application file for complete search history.

(56) References Cited

U.S. PATENT DOCUMENTS

| | | | | |
|---|---|---|---|---|
| 8,761,431 | B1* | 6/2014 | Jackson | H04R 5/0335 381/385 |
| 2011/0224481 | A1 | 9/2011 | Lee et al. | |
| 2013/0136279 | A1* | 5/2013 | Brown | H04R 1/105 381/151 |
| 2014/0016800 | A1* | 1/2014 | Dong | H04R 1/028 381/151 |
| 2019/0129200 | A1* | 5/2019 | Moskowitz | H05K 7/02 |

FOREIGN PATENT DOCUMENTS

| | | | | |
|---|---|---|---|---|
| CN | 104936108 | A | 9/2015 | |
| CN | 105007551 | A | 10/2015 | |
| CN | 105425425 | A | 3/2016 | |
| CN | 205176414 | U | 4/2016 | |
| CN | 205720956 | U | 11/2016 | |
| CN | 106937221 | A | 7/2017 | |
| CN | 206421112 | U | 8/2017 | |
| EP | 2869591 | A1 | 5/2015 | |
| JP | S5588497 | A | 7/1980 | |
| JP | 2006157318 | A | 6/2006 | |
| KR | 100769289 | B1 | 10/2007 | |
| KR | 20080082171 | A | 9/2008 | |
| KR | 101786613 | B1 | 10/2017 | |
| KR | 101853248 | B1 * | 4/2018 | ............ G02C 11/06 |
| WO | 2014097744 | A1 | 6/2014 | |
| WO | WO-2018236126 | A1 * | 12/2018 | ............ G02C 11/06 |

OTHER PUBLICATIONS

International Search Report in PCT/CN2018/102360 mailed on Nov. 13, 2018, 6 pages.
Written Opinion in PCT/CN2018/102360 mailed on Nov. 13, 2018, 6 pages.

* cited by examiner

BONE CONDUCTIVE SOUND GENERATING DEVICE

CROSS REFERENCE TO RELATED APPLICATIONS

This is a divisional application of U.S. patent application Ser. No. 16/924,122 filed on Jul. 8, 2020, which is a continuation-application of PCT Application No. PCT/CN2018/102360, filed on Aug. 24, 2018, and claims the priority of Chinese patent application No. 201810017175.1, filed on Jan. 8, 2018.

TECHNICAL FIELD

The present disclosure relates to the field of earphones, and more particularly, a bone conductive sound generating device.

BACKGROUND

Generally, sound may transmit into an ear in two ways, through air conduction and through bone conduction.

In the way of bone conduction, a bone conductive vibrating speaker may transfer an electrical audio signal into a mechanical vibration signal, and the mechanical vibration signal may be conducted into a cochlea through biological tissues or bones, such that a user of the speaker may hear the sound. Compared to a conventional way of sound transmission in which a sound wave is generated by a diaphragm, many procedures of sound conduction may be omitted when the sound wave transmits through bones. An original sound may be restored clearly in noisy environment, and the sound wave may not affect other people due to being diffused in the air.

However, during a long-term study, the applicant of the present disclosure discovers that a bone conduction speaker of a conventional bone conductive sound generating device may be adhered to a mastoid (such as a bone conductive hearing aid), a front end of a tragus (such as a bone conduction stereo earphone), other positions of a skull (such as a bone conduction communication helmet), and the like. A bone conductive path of the sound of the above-mentioned devices may be the sound/vibration being conducted through a skin and subcutaneous tissues to the bones, and further being conducted through the bones to the cochlea, such that a sense of bone conduction hearing may be generated. In such a way, a frequency bandwidth of the sound/vibration conducted through bones may be reduced, resulting a poor quality of the sound, and a user may have an unideal listening experience.

SUMMARY OF THE DISCLOSURE

According to a first aspect of the present disclosure, a bone conductive sound generating device is provided and includes: a fixing mechanism, a first bone conductive speaker mechanism, and a first connection member. The fixing mechanism includes a rim, a first arm, and a second arm. The first arm and the second arm are connected to two opposite sides of the rim. The first bone conductive speaker mechanism is connected to an end of the first arm away from the rim. The first connection member is configured to connect the first bone conductive speaker mechanism to the first arm, such that the first bone conductive speaker mechanism is capable of moving from a first fixed position relative to the first arm to a second fixed position relative to the first arm through the first connection member. The bone conductive sound generating device further includes a rotational shaft assembly, configured to connect the rim with the first arm. The rotational shaft assembly comprises a first rotational shaft, an end of the first rotational shaft is fixedly connected to one of the rim and the first arm, the other end of the first rotational shaft is rotatably connected to the other one of the rim and the first arm, such that the rim and the first arm are rotatable relative to each other around the rotational shaft assembly. The first rotational shaft defines a thread channel along an axial direction of the first rotational shaft, two end faces of the first rotational shaft define two thread openings being fluidly coupled to an external environment, the thread channel is defined to be fluidly coupled to the two thread openings to further be fluidly coupled to the external environment. When the first bone conductive speaker mechanism is in the first fixed position relative to the first arm, a first angle is defined between the first bone conductive speaker mechanism and the first arm. When the first bone conductive speaker mechanism is in the second fixed position relative to the first arm, a second angle is defined between the first bone conductive speaker mechanism and the first arm. The first angle is less than the second angle.

According to a second aspect of the present disclosure, a head-mounted earphone is provided and includes: a frame, a first speaker assembly, a second speaker assembly, a first hinge, and a second hinge. The frame includes a rim, a first arm, a second arm, and a rotational assembly. The rotational assembly is configured to connect the first arm and the second arm to two opposite ends of the rim. The first speaker assembly includes a first connection member and a first speaker mechanism connected with each other. The second speaker assembly includes a second connection member and a second speaker mechanism connected with each other. The first hinge is configured to connect an end of the first connection member away from the first speaker mechanism to an end of the first arm away from the rim. The second hinge is configured to connect an end of the second connection member away from the second speaker mechanism to an end of the second arm away from the rim. A distance between the end of the first connection member away from the first speaker mechanism and the end of the first arm away from the rim is adjustable via the first hinge. When the first hinge is in a first state, the first speaker mechanism is in a first fixed position relative to the first arm, and a first distance is defined between the end of the first connection member away from the first speaker mechanism and the end of the first arm away from the rim. When the first hinge is in a second state, the first speaker mechanism is in a second fixed position relative to the first arm, and a second distance is defined between the end of the first connection member away from the first speaker mechanism and the end of the first arm away from the rim, wherein the first distance is less than the second distance. The frame further includes a rotational shaft assembly, configured to connect the rim with the first arm. The rotational shaft assembly comprises a first rotational shaft, an end of the first rotational shaft is fixedly connected to one of the rim and the first arm, the other end of the first rotational shaft is rotatably connected to the other one of the rim and the first arm, such that the rim and the first arm are rotatable relative to each other around the rotational shaft assembly. The first rotational shaft defines a thread channel along an axial direction of the first rotational shaft, two end faces of the first rotational shaft define two thread openings being fluidly coupled to an external environment, the thread channel is defined to be fluidly coupled to the two thread openings to further be fluidly coupled to the external environment.

According to a third aspect of the present disclosure, a bone conductive speaker assembly is provided and includes a connection member and a bone conductive speaker mechanism. An end of the connection member is connected to the bone conductive speaker mechanism, and the other end of the connection member is capable of being electrically connected to an end of an arm of eyeglasses. The bone conductive speaker mechanism has a protruded curved face, and the protruded curved face is capable of adhering to and fitting with a predefined region of a back of an auricle of an ear. A center of the predefined region directly faces a crus of helix of the ear. The eyeglasses include: a rim, a first arm, a second arm, and a rotational shaft assembly, the first arm and the second arm are connected to two opposite sides of the rim, the rotational shaft assembly is configured to connect the rim with the first arm. The rotational shaft assembly comprises a first rotational shaft, an end of the first rotational shaft is fixedly connected to one of the rim and the first arm, the other end of the first rotational shaft is rotatably connected to the other one of the rim and the first arm, such that the rim and the first arm are rotatable relative to each other around the rotational shaft assembly. The first rotational shaft defines a thread channel along an axial direction of the first rotational shaft, two end faces of the first rotational shaft define two thread openings being fluidly coupled to an external environment, the thread channel is defined to be fluidly coupled to the two thread openings to further be fluidly coupled to the external environment.

DETAILED DESCRIPTION

Before illustrating various embodiments of the present disclosure, technologies in the related art will be briefly introduced.

Different from air conduction, conducting a sound/vibration through bones may involve a solid medium or a mixture of a solid medium and a liquid medium. Properties of a conduction path may significantly affect the quality of the sound conducted through bones. Therefore, a significant strategy of improving the quality of the sound through bone conduction may be selecting an appropriate path for the sound to be conducted through bone and adjusting and regulating the properties of the conduction path.

Figure 1:
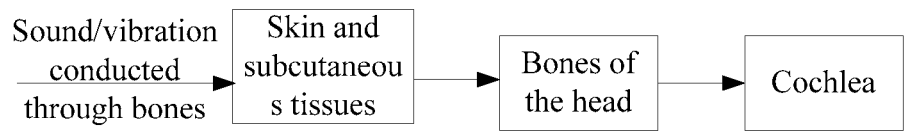
FIG. 1 is a diagram of a pathway of a sound/vibration being conducted through bones in a related art.

A typical strategy may be adhering the bone conductive speaker to a mastoid (such as a bone conductive hearing aid), a front end of a tragus (such as a bone conduction stereo earphone), other positions of a skull (such as a bone conduction communication helmet), and the like. A bone conduction path of the above-mentioned devices may be the sound/vibration being conducted through a skin and subcutaneous tissues to reach the bones, and the sound/vibration being conducted through the bones to reach a cochlea, such that a sense of bone conductive hearing may be generated. An example of conduction paths may be shown in FIG. 1. The conduction path shown in FIG. 1 may affect the quality of the sound conducted through bones in following manners. Firstly, the skin and the subcutaneous tissues may have relatively high mechanical damping, an efficiency of conducting a high frequency sound/vibration may be relatively low, such that the high frequency of the sound conducted through the bone may be reduced or lost. Secondly, the bones of the conduction path may have relatively high rigidity, an efficiency of conducting a low frequency sound/vibration may be relatively low, such that the low frequency of the sound conducted through the bone may be reduced or lost.

Figure 2:
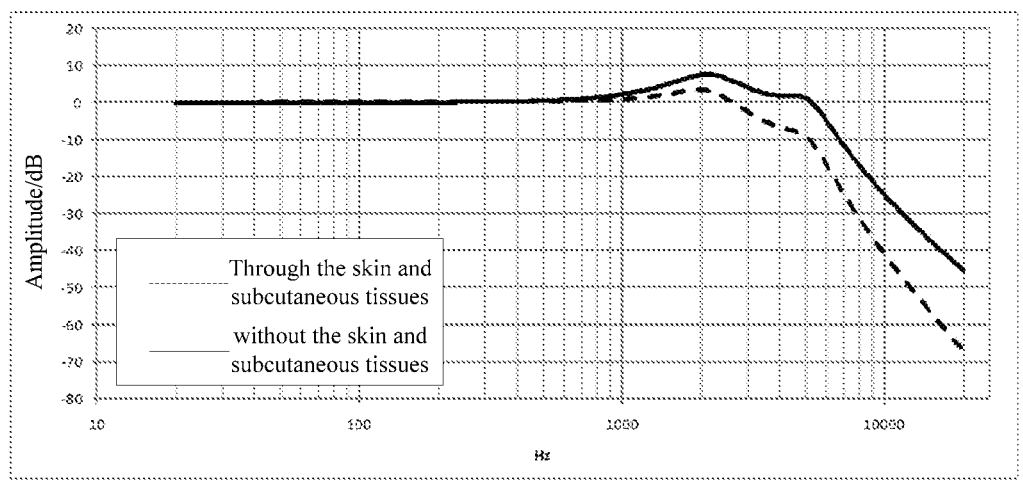
FIG. 2 shows an amplitude-frequency curve of the sound/vibration propagation through a skin and subcutaneous tissues and an amplitude-frequency curve of the sound/vibration propagation without the skin and subcutaneous tissues.
Figure 3:
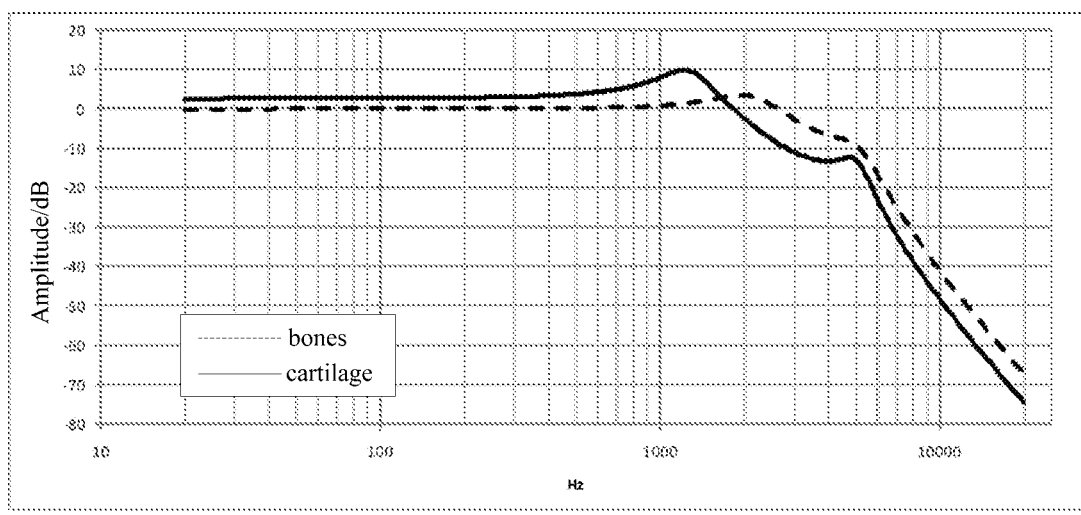
FIG. 3 shows an amplitude-frequency curve of the sound/vibration propagation through bones and an amplitude-frequency curve of the sound/vibration propagation through cartilage.

Further, an effect of the skin, the subcutaneous tissues, and the rigidity of the bones on properties of a frequency domain of the sound along the conduction path may be calculated. Firstly, as shown in FIG. 2, a medium-high frequency region of an amplitude-frequency of the sound is significantly decreased due to the skin and the subcutaneous tissues, indicating that the skin and the subcutaneous tissues may reduce an efficiency of conducting the high frequency of the sound. Further, as shown in FIG. 3, as the rigidity of the bones changes, the entire frequency range of the amplitude-frequency curve of the sound along the conduction path changes. In particular, an efficiency of conducting a low frequency sound may be significantly affected. As the rigidity of the bones increases, a medium-low frequency portion of the sound decreases, indicating that the rigidity of the bones may reduce an efficiency of ducting the medium-low frequency sound.

In other words, the skin, the subcutaneous tissues, and the rigidity of the bones may reduce a frequency bandwidth of the sound conducted through the bone, such that the sound quality may be reduced, and the user may have an unideal listening experience.

Technical solutions of embodiments of the present disclosure will be illustrated clearly and comprehensively by referring to the drawings of the embodiments. Obviously, the embodiments to be illustrated are only a part of, but not all of the embodiments. Based on the embodiments of the present disclosure, any one of skill in the related art may obtain all other embodiments without contributing creative work, and the obtained other embodiments should be within the scope of the present disclosure.

Figure 4:
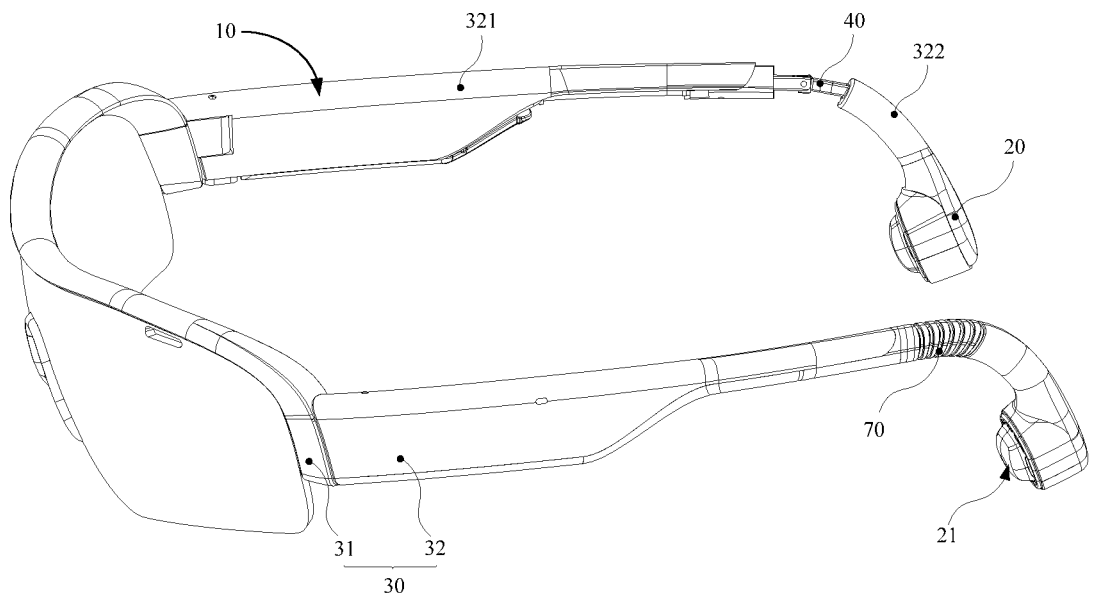
FIG. 4 is a structural schematic view of a bone conductive sound generating device according to an embodiment of the present disclosure.

As shown in FIG. 4, a structural schematic view of a bone conductive sound generating device according to an embodiment of the present disclosure is shown.

It should be noted that the bone conductive sound generating device of the present disclosure may be any device having a function of an earphone allowing bone conduction, such as a bone conductive earphone and eyeglasses, a hat, a head accessory, other head-mounted engineering supplies, and head-mounted military supplies having functions of generating the sound that can be conducted through bones, or an assistive listening device such as a hearing aid, which will not be limited by the present application.

The bone conductive sound generating device may include: a fixing mechanism 10 and a bone conductive speaker mechanism 20. The fixing mechanism 10 may be configured with the bone conductive speaker mechanism 20. At least when the bone conductive speaker mechanism 20 is in use, the fixing mechanism 10 may be configured to enable the bone conductive speaker mechanism 20 to be adhered to and fit with a back of an auricle of a user.

To be noted that, the auricle may be a part of an external ear and may substantially be composed of cartilage. In the present embodiment, the bone conductive speaker mechanism 20 may be adhered to and fit with the back of the auricle, such that the sound/vibration may be conducted through the cartilage of the auricle.

Figure 5:
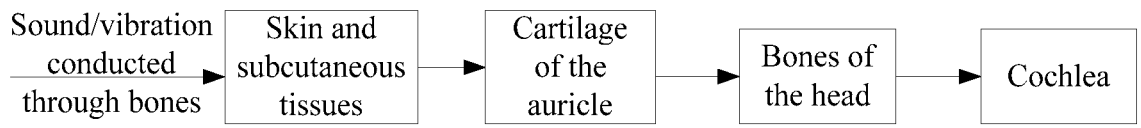
FIG. 5 is a diagram of a path the sound/vibration being conducted through bones according to an embodiment of the present disclosure.

Compared to the bones, rigidity of the cartilage may be relatively low. An efficiency of the low-frequency sound/vibration conducted through the cartilage may be relatively high, the low-frequency sound may be well conducted, reducing a loss of the low-frequency sound during conduction. Further, as the auricle is in a shape of a sector, when the sound/vibration are conducted through the bones, the auricle and other tissues connected to the auricle may generate vibration correspondingly, such that a corresponding air conductive sound may be generated. At the same time, in an ear canal, vibration of the auricle may cause a side wall of the ear canal to vibrate, such that air in the ear canal may generate high-frequency resonance. The air conductive sound may further compensate the loss of the low-frequency sound/vibration in a process of bone conduction and the loss of the high-frequency sound/vibration in a process of the sound/vibration being conducted through the skin and the subcutaneous tissues. In particular, when the bone conductive speaker is adhered to and fit with the auricle, the path of the sound/vibration propagating through the bones may be shown in FIG. 5. In other words, a medium of cartilage for conducting the sound may be included in the conduction path.

Figure 6:
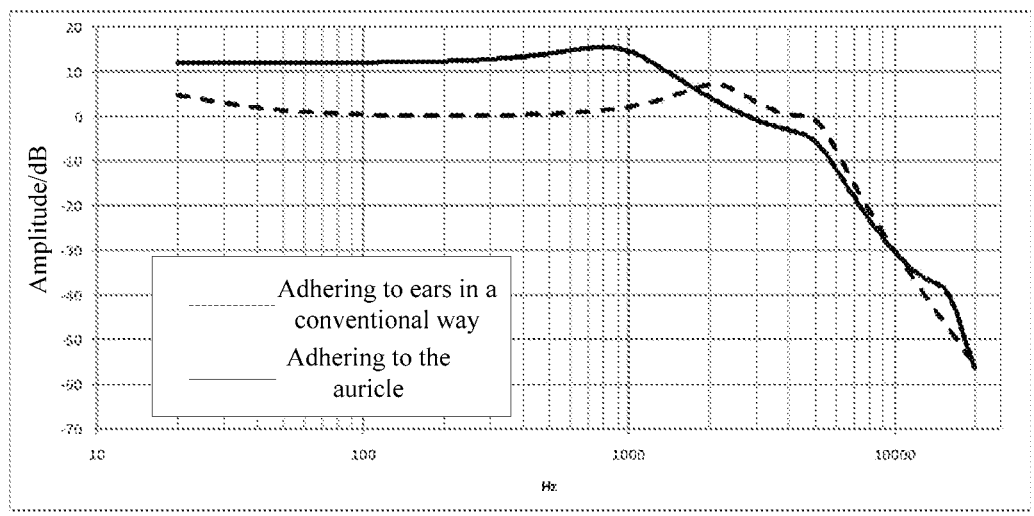
FIG. 6 shows an amplitude-frequency curve of sound/vibration propagation of a conventional sound generating device when the conventional sound generating device being adhered to a user in a conventional way and an amplitude-frequency curve of sound/vibration propagation of a sound generating device of the present disclosure when the sound generating device of the present disclosure being adhered to an auricle of the user.

In addition, as shown in FIG. 6, a frequency domain property of the sound along the conduction path while the bone conductive speaker mechanism 20 adhering to and fitting with the back of the auricle and a frequency domain property of the sound along the conduction path while a bone conductive sound generating device in the related art adhering the ear of the user in a conventional way may be calculated mathematically. Compared to the related art, as a process of conducting the sound through the auricle cartilage is included in the conduction path, the medium-low frequency sound of the amplitude-frequency curve of the conduction path may be significantly increased, indicating that adhering the bone conductive speaker mechanism 20 to the back of the auricle of the user according to the present disclosure may reduce the loss of the low frequency sound during conduction.

Further, the bone conductive speaker mechanism 20 is adhered to the back of the auricle, the sound quality may be improved, and at the same time, an effect of the bone conductive speaker mechanism 20 on the ear canal may be reduced when the sound is being conducted. As the bone conduction mechanism 20 may be adhered to the back of the auricle, the bone conduction mechanism 20 may be hidden behind the ear and may not be shown on an appearance, meeting various demands of the user.

Figure 7:
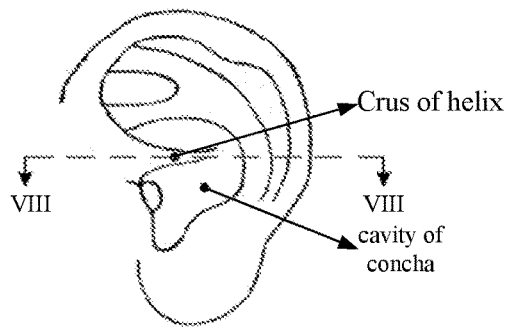
FIG. 7 is an anatomic view of an ear of a human.
Figure 8:
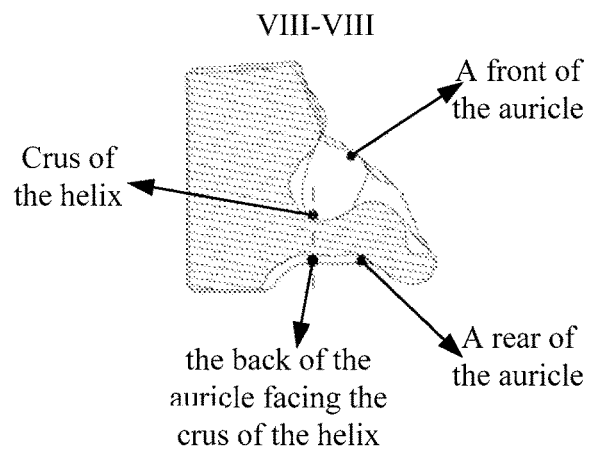
FIG. 8 is a cross-sectional view of the ear shown in FIG. 7, taken along a line VIII-VIII.

Alternatively, the fixing mechanism 10 may be configured with the bone conductive speaker mechanism 20, enabling the bone conductive speaker mechanism 20 to be adhered to and fit with a predefined region of the back of the auricle. Further, a region of the back of the auricle directly facing a crus of helix may be relatively flat, enabling a relatively larger area of the bone conductive speaker mechanism 20 to be adhered and fit, improving an efficiency of vibrating conduction and obtaining a higher volume of the sound. In addition, the cartilage of the region may be relatively thick, closer to an internal ear canal, and having higher tenacity. Therefore, while generating a better sound quality, an edge of the auricle may not be driven to vibrate and may not be numb or itchy due to vibration, and the user may not have uncomfortable feelings. Therefore, the predefined region may be the region directly facing the crus of helix, as shown in FIGS. 7 and 8. In particular, the predefined region may be a region in 20 cm$^2$ having a center directly facing the crus of helix. Alternatively, the predefined region may be a region in 10 cm$^2$ having a center directly facing the crus of helix, which is a portion of the back of the auricle without the helix. Alternatively, the predefined region may be a region in 5 cm$^2$ having a center directly facing the crus of helix, which is a region of the back of the auricle corresponding to a cavity of concha.

Further, the fixing mechanism 10 may be a mechanism specifically configured to fix the bone conductive sound generating device. When the user needs to use the bone conductive sound generating device, the fixing mechanism 10 may be fixedly positioned near the ear of the user, such that the bone conductive speaker mechanism 20 may be adhered to and fit with the back of the auricle. Alternatively, the fixing mechanism 10 may be another device connected to the bone conductive speaker mechanism 20 and having functions independent from the bone conductive speaker mechanism 20. When the user is wearing the device, the user may adhere the bone conductive speaker mechanism 20 indirectly to the back of the auricle by certain means, such that when the user is using the device for other purposes, the bone conductive sound generating device may provide the sound generating function at the same time.

As shown in FIG. 4, in an application scenario, the fixing mechanism 10 may be an eyeglass frame 30. The eyeglass frame 30 may include a rim 31 and an arm 32. The arm 32 may include a body portion 321 connected to the rim 31 and a connection member 322. The connection member 322 may be connected to an end of the body portion 321 away from the rim 31 via a hinge 40. The bone conductive speaker mechanism 20 may further be arranged on the connection member 322.

In the present embodiment, the eyeglass frame 30 may be a frame of shortsighted eyeglasses, a frame of longsighted eyeglasses, a frame of sunglasses, a frame of 3D glasses, a frame of intelligent glasses, a frame of virtual reality glasses, a frame of hologram glasses, a frame of augmented reality glasses, and the like, which will not be limited by the present disclosure.

Figure 9:
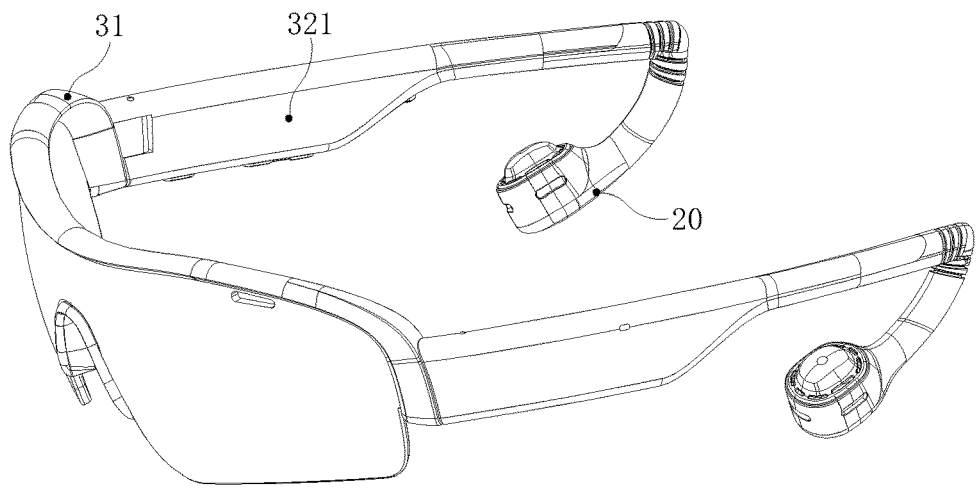
FIG. 9 is a structural schematic view of a bone conductive sound generating device according to an embodiment of the present disclosure.

Alternatively, the connection member 322 may be configured to allow the bone conductive speaker mechanism 20 and the body portion 321 to be switched between a first fixed relative position and a second fixed relative position arbitrarily. When the bone conductive speaker mechanism 20 is at the first fixed relative position, the bone conductive speaker mechanism 20 may be adhered to and fit with the back of the auricle of the user. In particular, the first fixed relative position between the bone conductive speaker mechanism 20 and the body portion 321 may be shown in FIG. 9, and the second fixed relative position between the bone conductive speaker mechanism 20 and the body portion 321 may be shown in FIG. 4. It may be noted that, in the present embodiment, when the bone conductive speaker mechanism 20 and the body portion 321 are at one of the first and the second fixed relative positions, the hinge 40 may apply a predefined force to enable the bone conductive speaker mechanism 20 to switch to the other one of the first and the second fixed relative positions. The position of the bone conductive speaker mechanism 20 may not be automatically changed due to a gravity of itself or other factors, such that the user may accurately position the bone conductive speaker mechanism 20.

In an embodiment, the bone conductive speaker mechanism 20 and the body portion 321 may be arranged in the first fixed relative position and the second fixed relative position only, and a transitional state between the first and the second fixed relative positions is not available. For example, when the bone conductive speaker mechanism 20 and the body portion 321 are at the second fixed relative position as shown in FIG. 4, the bone conduction eyeglasses may be used as general eyeglasses. The user may manually perform a force to the hinge 40 greater than the predefined force to trigger the connection member 322. The connection member 322 and the bone conductive speaker mechanism 20 may be bent relative to the body portion 321, such that the bone conductive speaker mechanism 20 and the body portion 321 may be at the first fixed relative position, enabling the bone conductive speaker mechanism 20 to adhere to and fit with the back of the auricle of the user. In such a way, the user may user the bone conduction eyeglasses as conventional eyeglasses and as an earphone at the same time. Other relative positional relationship between the first and the second fixed relative positions may not be available.

In other embodiments, the bone conductive speaker mechanism 20 and the body portion 321 may be configured at one or more fixed relative positions other than the first and the second fixed relative positions to meet various demands of the user.

Alternatively, the bone conductive speaker mechanism 20 may include a fitting face 21 configured to adhere to and fit with the back of the auricle of the user when the bone conductive speaker mechanism 20 is in use, such that the sound/vibration may be conducted through the back of the auricle.

At least a portion of the fitting face 21 may be curved. For example, the back of the auricle may have an irregular shape, and the fitting face 21 may include a curved face protruding towards the back of the auricle, such that the bone conductive speaker mechanism 20 may well fit with the back of the auricle. To be specific, the fitting face 21 may further include a curved face being protruded and having a curvature less than or equal to 1, such that the bone conductive speaker mechanism 20 may sufficiently contact the back of the auricle, and the efficiency of the bone conductive speaker mechanism 20 conducing the sound/vibration through the back of the auricle may be improved.

Figure 10:
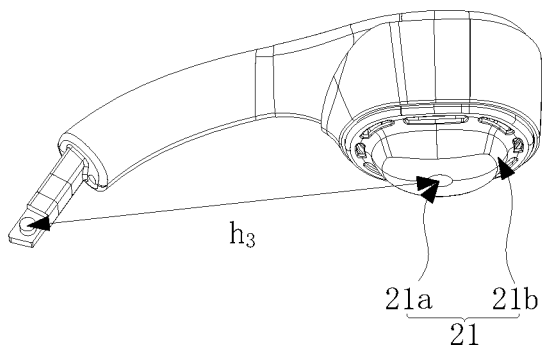
FIG. 10 is a structural schematic view of a bone conductive speaker mechanism of a bone conductive sound generating device according to an embodiment of the present disclosure.

In addition, as shown in FIG. 10, in an embodiment, the fitting face 21 may include a flat face 21a in a middle of the fitting face 21 and a curved face 21b extending along a circumferential direction of the flat face 21a, i.e., the curved face 210 may extend away from an edge of the flat face 21a. The flat face 21a and the curved face 21b may cooperatively form a curved fitting face protruding towards the back of the auricle.

Alternatively, an area of the fitting face 21 may be not less than 0.5 cm² or 1 cm². As the area of the fitting face 21 of the present embodiment is large enough, an area of a contact between the bone conductive speaker mechanism 20 and the back of the auricle may be large enough, such that a pressure of the fitting face 21 of the bone conductive speaker mechanism 20 applied on the back of the auricle of the user may be reduced, providing a more comfortable bone conductive sound generating device for the user, and the efficiency of conducting the sound/vibration through the bones may be improved, a volume of the sound may be high enough, and the user's demand may be met.

In one embodiment, as shown in FIG. 4, the connection member 322 may be curved to fit a shape of the auricle. A portion of the connection member 322 may be curved along the shape of the auricle, such that when the user is using the bone conductive sound generating device, the connection member 322 may be configured to surround the back of the auricle of the user.

The connection member 322 may be a flexible connection rod being elastic. The flexible connection rod may be made of rubber or have a composite structure of the rubber and an elastic metal thread, such as a composite structure of the rubber and a titanium or titanium alloy thread, or a composite structure of the rubber and a memory alloy thread.

When the user is wearing the bone conductive sound generating device and at least when the bone conductive sound generating device is in use, with a support from the eyeglass frame 30, the connection member 322 may apply an elastic force to the bone conductive speaker mechanism 20, such that the bone conductive speaker mechanism 20 may be adhered to and fit with the back of the auricle with a predefined pressure.

Figure 11:
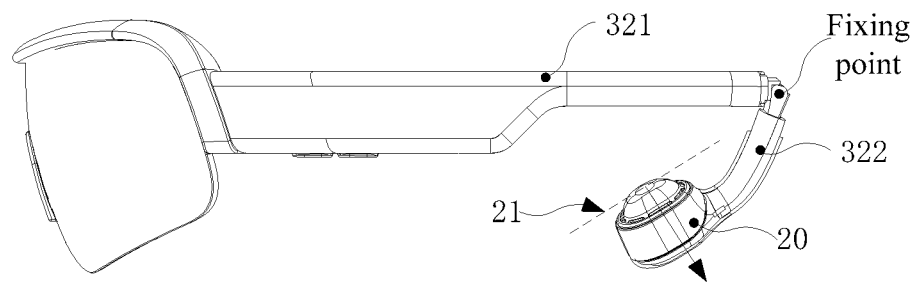
FIG. 11 is a schematic view of a pressure test of a bone conductive speaker mechanism of a bone conductive sound generating device onto an auricle according to an embodiment of the present disclosure.

The predefined pressure may refer to a pressure that the fitting face 21 applies to the user's ear along a direction perpendicular to the fitting face 21 when the user is wearing and using the bone conductive sound generating device. An elastic constant of the material of the connection member 322, a shape and a size of the connection member 322 may influence the predefined pressure that the bone conductive speaker mechanism 20 may apply to the back of the auricle. A test may be performed to obtain the pressure that the fitting face 21 applies to the back of the auricle of the user. To be specific, as shown in FIG. 11, when the user is using the device normally, the fitting face 21 of the bone conductive speaker mechanism 20 may well fit the back of the auricle. A central point of a connection between the body portion 321 and the connection member 322 may be a fixing point, and a hinge 40 may be configured at the fixing point. A force detection apparatus may drag the bone conductive speaker mechanism 20 away from the back of the auricle along a direction perpendicular to the fitting face 21. A force which is detected at the time of the bone conductive speaker mechanism 20 just leaving the back of the auricle may be taken as the pressure that the bone conductive speaker mechanism 20 applies to the back of the auricle. Based on a detected value, the material, the shape, and the size of the connection member 322 may further be determined, such that a corresponding pressure may be within a proper range.

Of course, a value of the predefined pressure may not be fixed. For example, when the user is wearing the bone conductive sound generating device, various wearing states and various head shapes may correspond to various predefined pressures. Under such situations, as the connection member 322 is a flexible connection rod, the connection member 322 may be deformed with various degrees to fit the various head shapes, adapting to various situations.

To be specific, an upper limit of the predefined pressure may be set to be 1 N. Under the upper limit, a relatively large scaled deformation of the bone conductive speaker mechanism 20 may not be caused by an excessive pressure, such that the user may not feel pain or have other uncomfortable feelings. A lower limit of the predefined pressure may be 0.1 N, such that the fitting face 21 may adhere to and fit with the back of the auricle when the bone conductive speaker mechanism 20 is working, and the bone conductive speaker mechanism 20 may not depart from the back of the auricle due to the vibration of the bone conduction speaker.

Alternatively, the upper limit of the predefined pressure may be 0.8 N to reduce deformation of the auricle, such that the user may not feel uncomfortable when wearing the device for a long period of time. The lower limit of the predefined pressure may be 0.3 N, such that the bone conductive speaker mechanism 20 may stably adhere to and fit with the back of the auricle, while the area of the contact between the back of the auricle and the bone conductive speaker mechanism 20 may be increased as the auricle deforms. In such a way, the area of the contact may be large enough to conduct the sound/vibration through the bones, and the sound generating by a bone conductive sound generating device may be loud enough.

To be specific, the upper limit and the lower limit of the predefined pressure may be in other values between 0.1 N to 1 N to satisfy various head shapes, such as head shapes of males, head shapes of females, head shapes of adults, head shapes of adolescents, and the like, which will not be limited by the present disclosure.

Alternatively, the hinge 40 may include a hinge shaft 41, and the hinge shaft 41 may have a perpendicular bisector plane α. The connection member 322 may have a symmetric plane β. The fitting face 21 of the bone conductive speaker mechanism 20 may adhere to and fit with the ear and may have a central point O. The perpendicular bisector plane α, the symmetric plane β, and the central point O may be on a same plane or may be on a substantially same plane with a predefined range of deviation.

Figure 12:
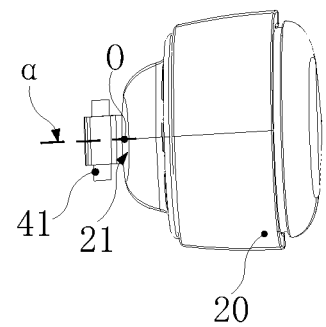
FIG. 12 is a side view of a bone conductive speaker mechanism according to an embodiment of the present disclosure.

The perpendicular bisector plane α of the hinge shaft 41 may refer to a plane perpendicular to an axis of the hinge shaft 41 and symmetrically separating the hinge shaft 41 into two identical parts, as shown in FIG. 12.

Figure 13:
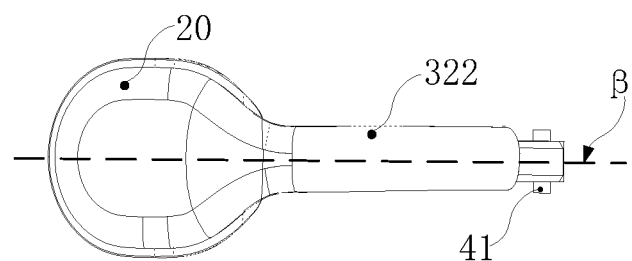
FIG. 13 is another side view of a bone conductive speaker mechanism according to an embodiment of the present disclosure.
Figure 14:
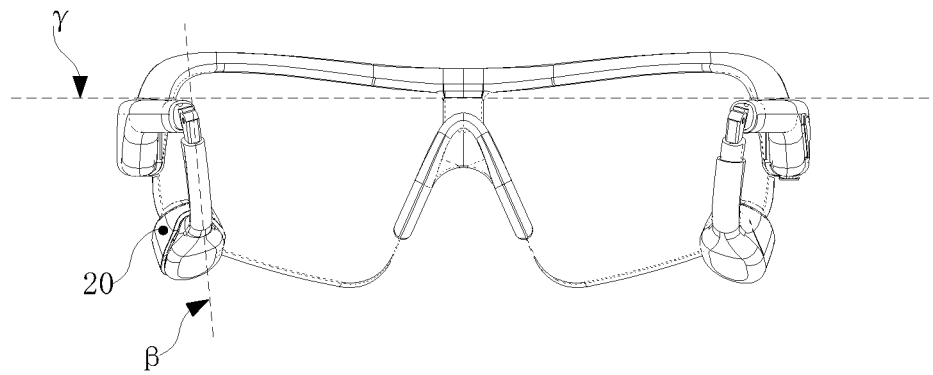
FIG. 14 is a rear view of a bone conductive sound generating device according to an embodiment of the present disclosure.

The symmetrical plane β of the connection member 322 may refer to a plane symmetrically separating the connection member 322. That is, two parts of the connection member 322 at two sides of the symmetrical plane β may be identical, as shown in FIG. 13.

The predefined range of deviation may be calculated based on experiences and statistical data of the material of the connection member, the size of the connection member, and the shape of the ear.

To be noted that, when the perpendicular bisector plane a of the hinge rotational shaft 41, the symmetrical plane β of the connection member 322, and the central point of the fitting face 21 of the bone conductive speaker mechanism 20 are on the same plane, the bone conductive speaker mechanism 20 which is connected to the connection member 322 directly adhere to and fit with the back of the auricle. When the connection member 322 deforms by receiving a force, a direction of deformation may be consistent with a direction along which the bone conductive speaker mechanism 20 moves, and both directions are on the same plane. A situation of the above-mentioned planes and points on different planes may be avoided. When the connection member 322 deforms by receiving the force, a situation of the bone conductive speaker mechanism 20 unable to adhere to and fit with the back of the auricle caused by twisting of the connection member 322 and the bone conductive speaker mechanism 20 may be avoided. Such the situation may reduce the efficiency of conducting the sound/vibration, and further reduce the sound quality of the bone conductive sound generating device. Of course, the perpendicular bisector plane α of the hinge rotational shaft 41, the symmetrical plane β of the connection member 322, and the central point of the fitting face 21 of the bone conductive speaker mechanism 20 may be substantially in the same plane with the predefined range of deviation. In such a way, when the device is in use, the user may not be affected significantly. However, to be noted that, the above-mentioned planes and points being substantially in the same plane with the predefined range of deviation may have an effect on the fitting with the back of the auricle of fitting face 21 of the bone conductive speaker mechanism 20.

Alternatively, two arms may be arranged on the eyeglass frame, the two arms may have two body portions 321, and the two body portions 321 may have two top portions. When the bone conductive speaker mechanism 20 and the two body portions 321 are at the first fixed relative position, the two top portions of the two body portions 321 may define a horizontal reference plane γ. An angle between the horizontal reference plane γ and the symmetrical plane of the connection member 322 may be 65° to 85°.

Figure 15:
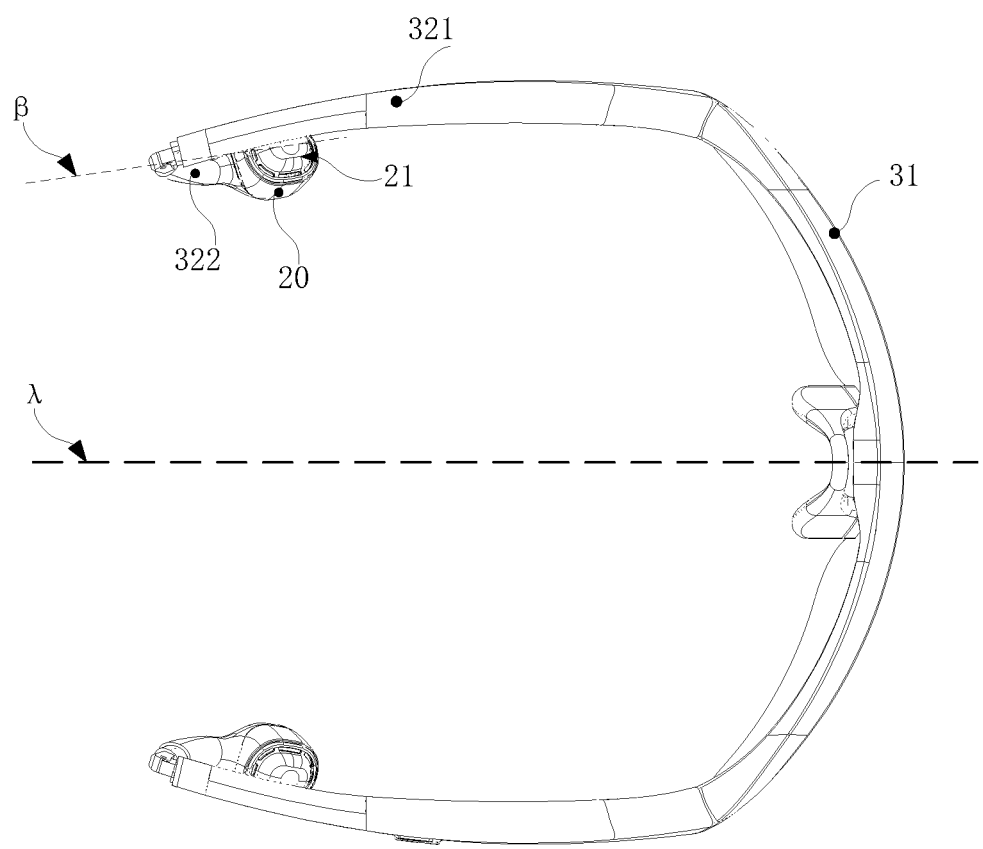
FIG. 15 is a schematic view of a bone conductive sound generating device according to an embodiment of the present disclosure.

The horizontal reference plane γ defined by the two top portions of the two body portions 321 may refer to a plane tangent to the two top potions at the same time. In an embodiment, the plane is further perpendicular to a symmetrical plane of the rim 31, as shown in FIG. 15. The symmetrical plane β of the connection member 322 of the present embodiment is the same as the above embodiment as shown in FIG. 13, and will not be described hereinafter repeatedly.

It may be understood that, when the bone conductive speaker mechanism 20 and the body potion 321 are at the first fixed relative position, and when the angle between the horizontal reference plane γ defined by the two top portions of the two body portions 321 and the symmetrical plane β of the connection member 322 is relatively large, the bone conductive speaker mechanism 20 may be closer to an outer side of the back of the auricle, i.e., away from the skull. When the angle is excessively large, the bone conductive speaker mechanism 20 may even be unable to adhere to and fit with the auricle. When the angle is relatively small, the bone conductive speaker mechanism 20 may be closer to an inner side of the back of the auricle or even compress the skull, reducing the comfort when the user wearing the device. In another aspect, conducting the sound/vibration of the bone conduction speaker through the ear cartilage may be affected, reducing the sound quality of the bone conductive speaker mechanism 20. When the angle is between 65° to 85°, the bone conductive speaker mechanism 20 may be able to adhere to and fit with a relatively central position of the back of the auricle.

Further, when the bone conductive speaker mechanism 20 and the body portion 321 are at the first fixed relative position, the angle between the horizontal reference plane γ defined by the two top portions of the two body portions 321 and the symmetrical plane β of the connection member 322 may be 70° to 82°, such that the fitting face 21 of the bone conductive speaker mechanism 20 may be closer to the region of the back of the auricle directly facing the crus of helix.

To be specific, when the bone conductive speaker mechanism 20 and the body portions 321 are at the first fixed relative position, the angle between the horizontal reference plane γ defined by the two top portions of the two body portions 321 and the symmetrical plane β of the connection member 322 may be at any value within the above-mentioned range, such as 70°, 75°, 80°, 82°, and the like, which will not be limited by the present disclosure.

Alternatively, when the bone conductive speaker mechanism 20 and the body portions 321 are at the first fixed relative position, an angle between the symmetrical plane λ of the rim 31 and the symmetrical plane β of the connection member 322 may be 5° to 30°.

The symmetrical plane λ of the rim 31 may refer to a plane symmetrically separating the rim 31, as shown in FIG. 15. The symmetrical plane β of the connection member 322 in the present embodiment may be the same as that in the above embodiment as shown in FIG. 13, and will not be repeatedly described hereinafter.

The angle between the symmetrical plane λ of the rim 31 and the symmetrical plane β of the connection member 322 may be correlated with the head shape of the user. For example, some users may have relatively large sized heads, and some may have relatively small sized head, and they may correspond to different angles. When the user is wearing the device, the user's ear may support a bottom face of the body portion 321, and a side face of the body portion may abut against the user's head, such that the bone conductive speaker mechanism 20 may be positioned at an appropriate position. Therefore, when the angle is relatively small, a front portion of the body portion 321 may abut against the user's head, and a rear portion of the body portion 321 may be away from the user's head. When the angle is relatively large, the front portion of the body portion 321 may be away from the user's head, and the rear portion of the body portion 321 may abut against the user's head. Under both situations, the body portion 321 may not contact the head properly, such that the fitting face of the bone conductive speaker mechanism 20 may depart from the back of the auricle, and the sound quality of the bone conductive speaker mechanism 20 may be reduced, the user may not use the device conveniently.

When the bone conductive speaker mechanism 20 and the body portion 321 are at the first fixed relative position, the angle between the symmetrically plane λ of the rim 31 and the symmetrical plane β of the connection member 322 may be 10° to 25°. Specifically, the angle may be 10°, 15°, 20°, 25°, and the like, which will not be limited by the present disclosure.

Figure 16:
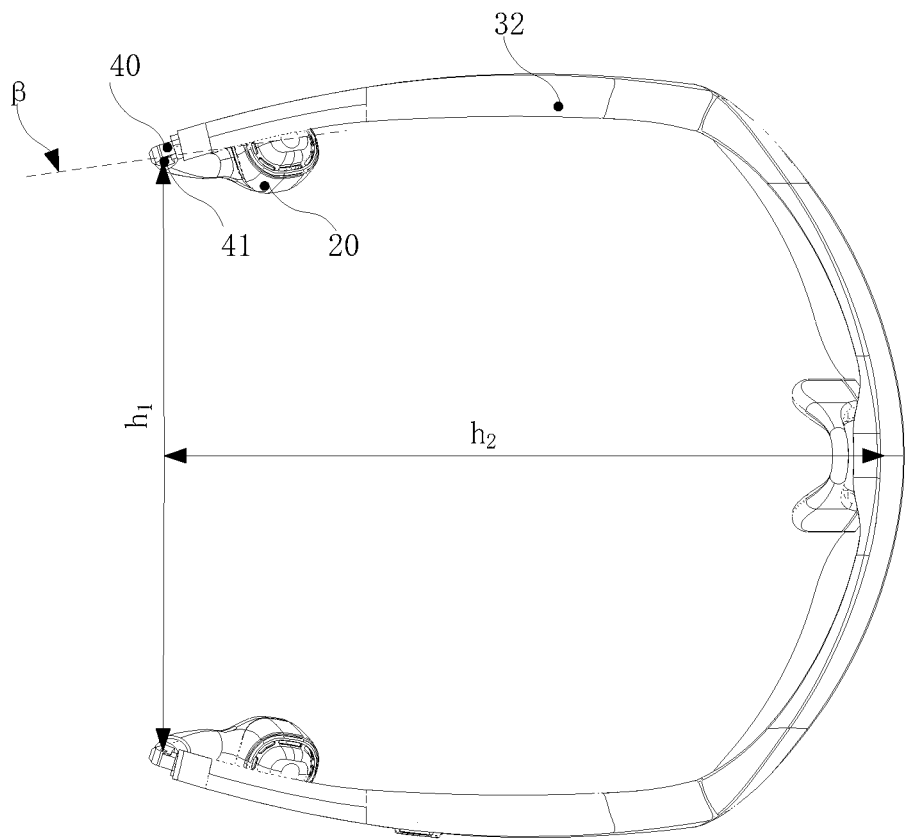
FIG. 16 is a schematic view showing distances between relative elements of bone conduction glasses according to an embodiment of the present disclosure.

Alternatively, as shown in FIG. 16, two arms 32 may have two hinge shafts 41. Each of the two hinge shafts 41 may have a central point. A distance between two central points of the two hinge shafts 41 may be $h_1$, and the distance $h_1$ may be from 90 mm to 150 mm. The distance $h_1$ may correspond to a width of the user's head between a left and a right of the head.

It may be understood that, the two arms 32 may be positioned above two ears and grip two sides of the head. When the distance $h_1$ between the two central points of the two hinge shafts 41 of the two arms 32 is relatively large, a gripping force that the two arms 32 applies to the user's head may be relatively small, and the two arms may not stably grip the user's head, such that the two arms may be loosen and depart from the user's head, and the bone conductive speaker mechanism 20 may deviate from a corresponding position of the back of the auricle. When the distance $h_1$ is relatively small, the two arms may grip the user's head too tightly, and the user may feel uncomfortable.

The distance $h_1$ between the two central points of the two hinge shafts 41 of the two arms may be from 100 mm to 130 mm. To be specific, the distance may be 100, 110, 120 mm, 130 mm, and the like. To be noted that, various users may select various earphones having appropriate distances $h_1$ fitting their head shapes. For example, an earphone for a male user may have the distance $h_1$ of 115 mm to 130 mm, and an earphone for a female user may have the distance $h_1$ of 100 mm to 115 mm. Of course, the distance $h_1$ may be set to be a value in both of the above-mentioned two ranges, such that the distance may be suitable for both male and female users.

Alternatively, as shown in FIG. 16, a vertical distance $h_2$ from a central point of the rim 31 to a line between the two central points of the two hinge shafts 41 may be 105 mm to 170 mm.

To be noted that, the central point of the rim 31 may be a mid-point of a bridge of a nose.

It may be understood that, when the vertical distance $h_2$ is relatively large, and when the fitting face 21 of the bone conductive speaker mechanism 20 adheres to and fits with the back of the auricle, the rim 31 may be relatively far away from eyes of the user. When the rim 31 is positioned properly, the fitting face 21 of the bone conductive speaker mechanism 20 may be positioned relatively far away from the back of the auricle, such that the fitting face 21 may not adhere to and fit with the back of the auricle properly. When the vertical distance is relatively small, and when using the device as eyeglasses and as the earphone at the same time, the rim 31 and the bone conductive speaker mechanism 20 may grip the user's head at the front and the back of the ears too tight, such that the user may feel uncomfortable. When the vertical distance is excessively small, the user may be unable to use the device as the eyeglasses and as the earphone at the same time.

The vertical distance $h_2$ from the central point of the rim to the line between the two central points of the two hinge shafts 41 may be 130 mm to 150 mm. To be specific, the vertical distance may be 130 mm, 140 mm, 150 mm, and the like. To be noted that, various groups of users may correspond to various ranges of the vertical distance. For example, a device for the male user may have the vertical distance $h_2$ in 140 mm to 160 mm, and a device for the female user may have the vertical distance $h_2$ in 105 mm to 135 mm. Of course, the vertical distance $h_2$ may be set to be a value within both of the above-mentioned two ranges, such that the device may be suitable for both male and female users.

Alternatively, as shown in FIGS. 16 and 10, a distance between the central point of the hinge shaft 41 and the central point O of a corresponding fitting face 21 of the bone conductive speaker mechanism 20 may be defined to be $h_3$. The vertical distance $h_2$ may be from the symmetrical central point of the rim to the line between the two central points of the two hinge shafts 41. A ratio of the distance $h_3$ to the vertical distance $h_2$ ($h_3/h_2$) may be 0.1 to 1.5.

The distance $h_3$ between the central point of the hinge shaft 41 and the central point O of the corresponding fitting face 21 of the bone conductive speaker mechanism 20 may correspond to a distance between the central point of the hinge shaft 41 to a position of the fitting face 21 for adhering to and fitting with the back of the auricle. The vertical distance $h_2$ from the symmetrical central point of the rim 31 to the line between the two central points of the two hinge rotational shafts 41 may correspond to a vertical distance between the front of the user's head and the back of the user's ear. When the vertical distance between the front of the user's head and the rear of the user's ear is fixed, and when the distance between the central point of the hinge rotational shaft 41 and the position of the fitting face 21 for adhering to and fitting with the back of the auricle is relatively large. That is, the above-mentioned ratio is relatively large, the distance between the central point of the hinge shaft 41 and the central point O of the corresponding fitting face 21 of the bone conductive speaker mechanism 20 may be relatively large, and the bone conductive speaker mechanism 20 may tend to adhere to and fit with a lower portion of the back of the auricle. When the above-mentioned ratio is relatively small, the distance between the central point of the hinge shaft 41 to the central point O of the corresponding fitting face 21 of the bone conductive speaker mechanism 20 may be relatively small, and the bone conductive speaker mechanism 20 may tend to adhere to and fit with an upper portion of the back of the auricle. In such a way, the efficiency of the bone conductive speaker mechanism 20 conducting the sound/vibration may be affected, further affecting the sound quality.

The ratio of $h_3/h_2$ may be 0.125 to 0.35. To be specific, the ratio may be 0.125, 0.15, 0.25, 0.30, 0.35, and the like, and may be determined according to various demands of the user, which will not be limited by the present disclosure.

Further, various bone conductive sound generating devices in various sizes may be produced based on the above-mentioned parameters, such that users may select an appropriate device based on their head shapes, various demands of the users may be met.

Figure 17:
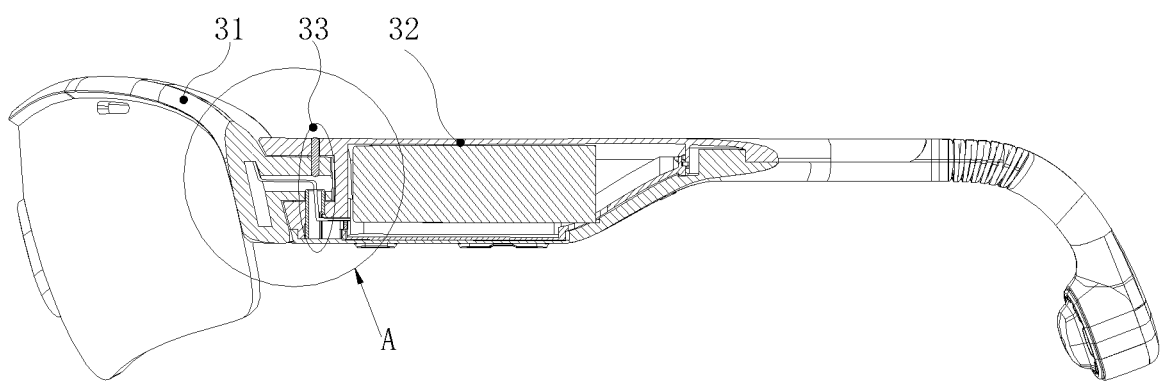
FIG. 17 is a cross-sectional view of a portion of a bone conductive sound generating device according to an embodiment of the present disclosure.
Figure 18:
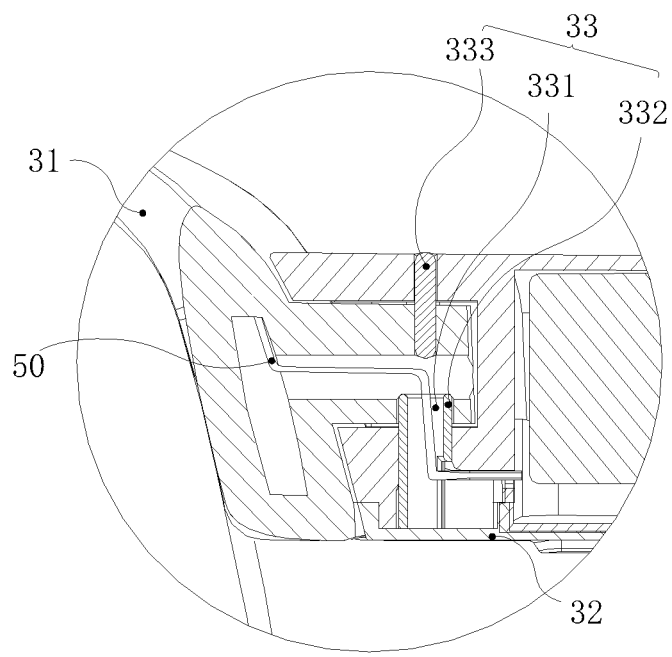
FIG. 18 is an enlarged structural schematic view of a portion A shown in FIG. 17.

Further, as shown in FIGS. 17 and 18, a cross-sectional view of a portion of the bone conductive sound generating device according to an embodiment of the present disclosure is shown in FIG. 17, and an enlarged schematic view of a portion A shown in FIG. 17 is shown in FIG. 18. In the present embodiment, the bone conductive sound generating device may further include a first connection thread 50, and the eyeglass frame 30 may further include a rotational shaft assembly 33.

The first connection thread 50 may be a thread for mechanical connection or electrical connection. In the present embodiment, a functional assembly may be arranged in each of two arms 32, and the first connection thread 50 may be configured for the electrical connection to achieve certain functions. Two rotational shaft assemblies 33 may be arranged, each rotational shaft assembly 33 may be configured to connect each rim 31 to the arm 32, such that the rim 31 and the arm 32 may rotate around the rotational shaft assembly 33. The rotational shaft assembly 33 may define a thread channel 331 along an axial direction. The first connection thread 50 may be configured to extend through the thread channel 331 to reach the rim 31 and the arm 32 respectively.

To be specific, in the present embodiment, the first connection thread 50 may extend through the thread channel 331. An end of the first connection thread 50 may extend to reach one of the two arms 32, and the other end of the first connection thread 50 may extend to reach the rim 31. The first connection thread 50 may further extend along a first receiving groove 111 to reach the other one of the two arms 32, such that two functional assemblies 16 arranged in the two arms 32 may be electrically connected.

It may be understood that, when the rim 31 and the two arms 32 are bent relative to each other, a relative position of a structure near the rotational shaft assembly 33 may be changed. When a portion of the first connection thread 50 arranged at a connection position between the rim 31 and the arm 32 is arranged to surround an outer side of the rotational shaft assembly 33 directly, the portion of the first connection thread 50 may be compressed or stretched as the rim 31 or the arm 32 are bent. The first connection thread 50 may be deformed or disrupted, such that stability of the first connection thread 50 may be affected, and service life of the first connection thread 50 may be reduced.

In the present embodiment, the rotational shaft assembly 33 may define a thread channel 331 along the axial direction, and the portion of the first connection thread 50 arranged at the connection position between the rim 31 and the arm 32 may be received in and extend through the thread channel 331. In such a way, when the rim 31 and the arm 32 are bent to each other, the first connection thread 50 received in the thread channel 331 may only rotate as the rotational shaft assembly 33 rotates, and therefore reducing compress or stretch of the first connection thread 50, such that the first connection thread 50 may be protected at some extent, improving the stability of the first connection thread 50 and increasing the service life of the first connection thread 50.

In the present embodiment, an inner diameter of the thread channel 331 may be greater than an outer diameter of the first connection thread 50. For example, the inner diameter of the thread channel 331 may be two times of the outer diameter of the first connection thread 50, such that the constraint of the inner wall of the thread channel 331 on the first connection thread 50 may be reduced, and an amplitude of rotation of the first connection thread 50 may be reduced when the rim 31 and the arm 32 are bent to each other.

Figure 19:
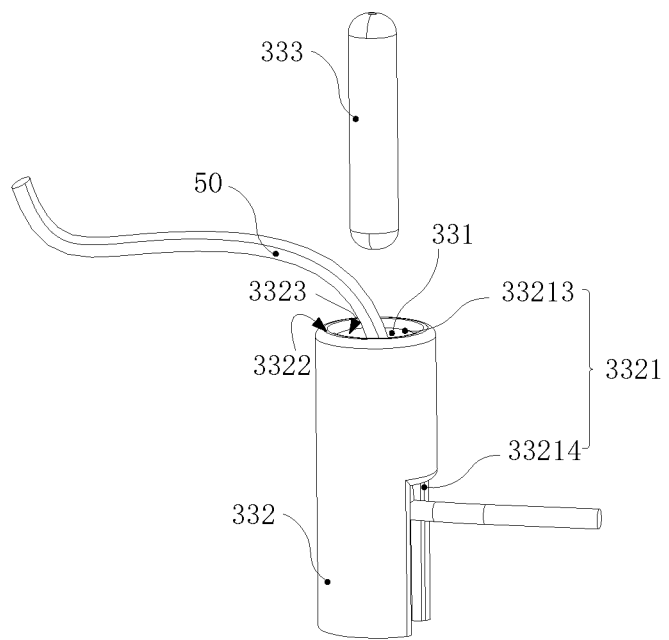
FIG. 19 is a structural schematic view of a rotation shaft assembly and a connection thread of a bone conductive sound generating device according to an embodiment of the present disclosure.

Further as shown in FIGS. 18 and 19, a structural schematic view of the rotational shaft assembly and the first connection thread of the bone conductive sound generating device is shown in FIG. 19. In the present embodiment, the rotational shaft assembly 33 may include a first rotational shaft 332. Two ends of the first rotational shaft 332 may be connected to the rim 31 and the arm 32 respectively. The thread channel 331 may be defined along an axial direction of the first rotational shaft 332. The first rotational shaft 332 may define a thread opening 3321 on at least one end face.

The thread channel 331 may be fluidly coupled to an external environment through the thread opening 3321. The first connection thread 50 may be configured to extend to reach the rim 31 or the arm 32 through the thread opening 3321.

To be noted that, in the present embodiment, the first rotational shaft 332 may be rotatably connected to one of the rim 31 and the arm 32 and fixedly connected to the other of the rim 31 and the arm 32, such that the rim 31 and the arm 32 may be rotatably connected around the first rotational shaft 332.

To be specific, in the present embodiment, the thread channel 331 may be defined inside the first rotational shaft 332 and fluidly coupled to the external environment through the thread opening 3321.

To be specific, the thread channel 331 may be defined to extend through at least one end face of the first rotational shaft 332, such that the thread opening 3321 of the thread channel 331 may be defined. In such a way, the first connection thread 50 may extend along the thread channel 331 to reach an outside of the thread channel via the at least one end face of the first rotational shaft 332, and further extend to reach the rim 31 or the arm 32. It may be understood that, there may be a large receiving space outside the end face of the first rotational shaft 332 and unoccupied by any component. A portion of the first connection thread 50 extending to the outside through the end face of the first rotational shaft 332 may be received in the unoccupied receiving space. At the end face, when the first rotational shaft 332 is rotatably connected to the corresponding rim 31 or the arm 32, and when the rim 31 and the arm 32 are bent relative to each other, a portion of the first connection thread 50 positioned near the thread opening 3321 of the end face may be twisted to some extent as the first rotational shaft 332 rotates, and the unoccupied receiving space may be defined to buffer the twisting of the first connection thread 50. The first connection thread 50 being twisted may be transferred into the first connection thread 50 being moving without being twisted, such that an extent of twisting the first connection thread 50 may be reduced, improving the stability of the first connection thread 50.

Figure 20:
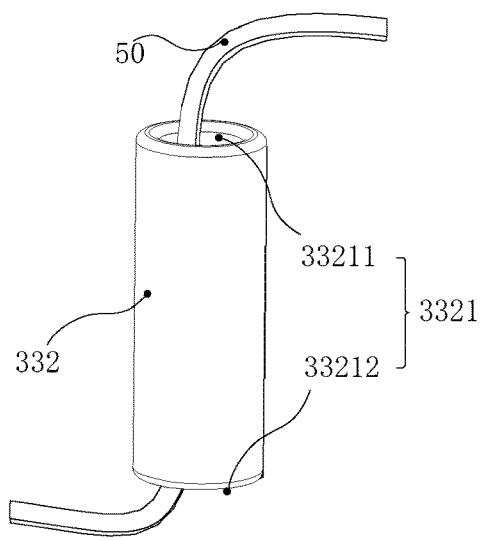
FIG. 20 is a structural schematic view of a first rotation shaft of a bone conductive sound generating device according to an embodiment of the present disclosure.

As shown in FIG. 20, a structural schematic view of the first rotational shaft of the bone conductive sound generating device is shown. In the present embodiment, the thread opening 3321 may include a first thread opening 33211 and a second thread opening 33212. The first and the second thread openings are defined at two end faces of the first rotational shaft 332 respectively. The thread channel 331 may be fluidly coupled to the external environment through the two thread openings 3321, such that the first connection thread 50 may extend through the two end faces of the first rotational shaft 332 and may extend to reach the rim 31 and the arm 32 through the first thread opening 33211 and the second thread opening 33212 respectively.

In other words, in the present embodiment, the portion of the first connection thread 50 positioned at the connection position between the rim 31 and the arm 32 may be received in the thread channel 331 of the first rotational shaft 332. The first connection thread 50 may extend out of the thread channel 331 through the two end faces of the first rotational shaft 332. Under such the situation, as there may be a relatively large receiving space out of the two end faces of the first rotational shaft 332 and unoccupied by any element of the device, when the rim 31 and the arm 32 rotate relative to each other, the first connection thread 50 that extends to the outside through the two ends faces of the first rotational shaft 332 may move or may be twisted at a relatively small degree, such that the first connection thread 50 may not be deformed due to being compressed or stretched.

Further as shown in FIG. 19, in the present embodiment, the thread opening 3321 may include a first thread opening 33213 and a second thread opening 33214. The first thread opening 33213 may be defined on an end face of the first rotational shaft 332, and the second thread opening 33214 may be defined on a side wall of the first rotational shaft 332. In such a way, an end of the thread channel 331 may be fluidly coupled to the first thread opening 33213 to extend through the end face of the first rotational shaft 332, and the other end of the thread channel 331 maybe fluidly coupled to the second thread opening 33214 to extend through the side wall of the first rotational shaft 332, such that the thread channel 331 may be fluidly coupled to the external environment. The first connection thread 50 may extend along the thread channel 331 to reach the rim 31 and the arm 32 through the first thread opening 33213 and the second thread opening 33214.

Similarly, there may be a relatively large receiving space near the end face of the first rotational shaft 332 defining the first thread opening 33213 and unoccupied by any element of the device. When the rim 31 and the arm 32 rotate relative to each other, the first connection thread 50 positioned near the first thread opening 33213 may move only or may be twisted at a small degree.

In one embodiment, the first rotational shaft 332 may be fixedly connected to one of the rim 31 and the arm 32 closer to the second thread opening 33214, and may be rotatably connected to the other one of the rim 31 and the arm 32. In other words, an end of the first rotational shaft 332 defining the thread opening 3321 may be rotatably connected to one of the rim 31 or the arm 32, and the side wall defining the thread opening 3321 may be fixedly connected to the other one of the rim 31 or the arm 32.

In one embodiment, the end of the first rotational shaft 332 defining the first thread opening 33213 is closer to the rim 31, and is rotatably connected to the rim 31. The side wall of the first rotational shaft 332 defining the second thread opening 33214 is closer to the arm 32, and is fixedly connected to the arm 32.

To be noted that, in the present embodiment, although the first rotational shaft 332 is rotatably connected to the rim 31, relative rotation between the rim 31 and the arm 32 may drive the first connection thread 50 to move relative to the first thread opening 33213. However, as the first thread opening 33213 is defined on the end face of the first rotational shaft 332, being similar to the above embodiment, there may be a relatively large receiving space near the end face of the first rotational shaft 332 and unoccupied by any element of the device. When the rim 31 and the arm 32 are bent rotatably relative to each other, the portion of the first connection thread 50 positioned near the thread opening 3321 of the end face may be twisted to some extent as the first rotational shaft 332 rotates, and the unoccupied receiving space may buffer the twisting of the portion of the first connection thread 50. The portion of the first connection thread 50 being twisted may be transformed into the portion of the first connection thread 50 being moving. Alternatively, the first connection thread 50 may be twisted at a small degree. In such a way, the first connection thread 50 may not be compressed or stretched, such that the stability of the connection thread may be improved, and the service life of the connection thread may be increased.

Further, the side wall of the first rotational shaft 332 may be fixedly connected to the arm 32. It may be understood that, when the rim 31 and the arm 32 are rotated relative to each other, the rim 31 and the first rotational shaft 332 may move synchronously. Therefore, the first connection thread 50 received in the thread channel 331 may extend to reach the rim 31 through the second thread opening 33214, and may not be twisted, compressed, or stretched. Therefore, the second thread opening 33214 may be defined on the end face of the first rotational shaft or the side wall of the first rotational shaft 332, and under either situation, relative rotation between the rim 31 and the arm 32 may not cause the first connection thread 50 to be twisted, compressed, stretched, or the like.

In other embodiments, when the side wall of the first rotational shaft 332 and the arm 32 are rotatably connected, and when the first rotational shaft 332 and the arm 32 rotate relative to each other to drive the first connection thread 50 to move, the first connection thread 50 may be constrained by a side wall of the second thread opening 33214 of the first rotational shaft 3321. Under such the situation, the first connection thread 50 may be compressed by the side wall of the first rotational shaft 332 and the arm 32.

When the end of the first rotational shaft 332 close to the arm 32 is configured to define the first thread opening 33213 and is rotatably connected to the arm 32, the side wall of the first rotational shaft 332 close to the rim 31 may be configured to define the second thread opening 33214 and may be fixedly connected to the rim 31. Similarly, when the rim 31 and the arm 32 are bent relative to each other, the first connection thread 50 received in the thread channel 331 may have a portion positioned near the first thread opening 33213 and another portion positioned near the second thread opening 33214, and the two portions of the first connection thread 50 may only be twisted at a small degree or moved without being twisted.

As shown in FIG. 19, in one embodiment, the rotational shaft assembly 33 may further include a second rotational shaft 333, the second rotational shaft 333 may be spaced apart from the first rotational shaft 332, and the second rotational shaft 333 and the first rotational shaft 332 may be coaxial.

In the present embodiment, the second rotational shaft 333 may be arranged at a side of the first rotational shaft 332 close to the first thread opening 33213. Of course, in other embodiments, the second rotational shaft 333 may be arranged at a side of the first rotational shaft 332 close to the second thread opening 33214.

Figure 21:
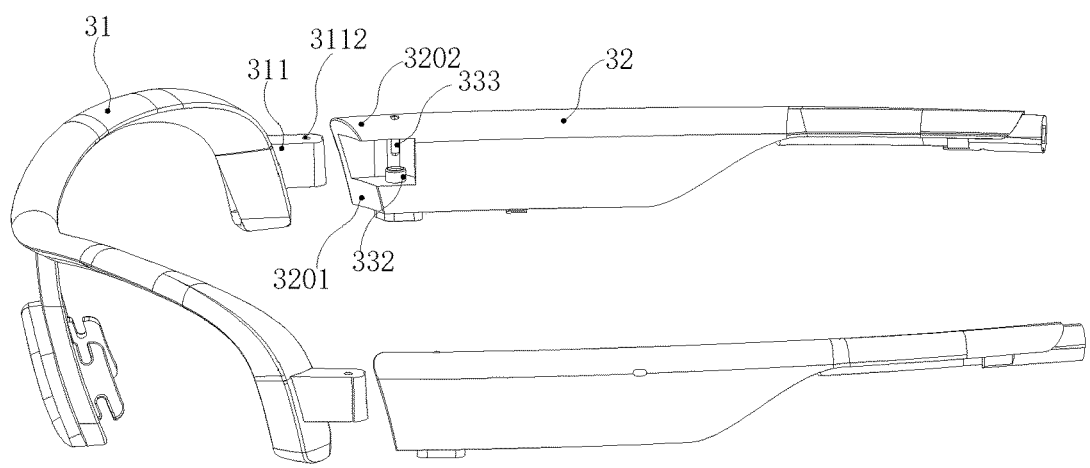
FIG. 21 is an exploded perspective view of a portion of a bone conductive sound generating device according to an embodiment of the present disclosure.

Further referring to FIG. 21, an exploded perspective view of a portion of the bone conductive sound generating device is shown. In the present embodiment, the rim 31 may include a first ledge 311. To be specific, the rim 31 may include two first ledges, the two first ledges 311 may be arranged at two ends of the rim respectively, the two ends may be connected to the two arms 32, and the two ledges 311 may protrude from the rim 31 towards the two arms 32 correspondingly.

The arm 32 may include a second ledge 3201 and a third ledge 3202, and the second ledge 3201 and the third ledge 3202 may be spaced apart from each other. The second ledge 3201 and the third ledge 3202 may protrude from the arm 32 towards the end of the rim 31 connected to the arm 32. When the user is wearing the eyeglasses, a side of the second ledge 3201 away from the user may be connected to a side of the third ledge 3202 away from the user, such that the eyeglasses may show an aesthetic and integral appearance. In an embodiment, an end of the arm 32 facing the rim 31 may have a middle portion, and the middle portion may define a concave to form the second ledge 3201 and the third ledge 3202.

Further, an end of the first rotational shaft 332 close to the second rotational shaft 333 and an end of the second rotational shaft 333 close to the first rotational shaft 332 may be connected to the first ledge 311. An end of the first rotational shaft 332 away from the second rotational shaft 333 and an end of the second rotational shaft 333 away from the first rotational shaft 332 may be connected to the second ledge 3201 and the second ledge 3202 respectively. In such a way, the first ledge 311 may be configured between the second ledge 3201 and the third ledge 3202.

As shown in FIG. 19, in an embodiment, the first thread opening 33213 may be defined on the end face of the first rotational shaft 332 close to the second rotational shaft 333. The second thread opening 33214 may be defined on the side wall of the first rotational shaft 332 close to the second ledge 3201. The first rotational shaft 332 may be rotatably connected to the first ledge 311 and fixedly connected to the second ledge 3201.

To be specific, in the present embodiment, an end of the first connection thread 50 received in the thread channel 331 may extend to the external environment through the first thread opening 33213 and through a space between the first rotational shaft 332 and the second rotational shaft 333. Further, in one embodiment, the first ledge 311 defines a thread channel being fluidly coupled to the first thread opening 33213, such that the first connection thread 50 may extend to reach an inside of the rim 31 through the first ledge 311.

In addition, the other end of the first connection thread 50 received in the thread channel 331 may extend to the external environment through the second thread opening 33214. Further, in an embodiment, the third ledge 3202 may define a thread channel being fluidly coupled to the second thread opening 33214, such that the first connection thread 50 may extend to reach the inside of the arm 32 through the thread channel in the third ledge 3202.

The second thread opening 33214 may be defined on the side wall of the first rotational shaft 332, instead of being defined on the end of the first rotational shaft 332 to be fluidly coupled to the thread channel 331 of the rotational shaft. In the present embodiment, the second thread opening 33214 may extend along the side wall of the first rotational shaft 332 to reach an end of the first rotational shaft 332 away from the first thread opening 33213. It may be understood that, in the present embodiment, the second thread opening 33214 may be defined to have a larger space, such that when the first connection thread 50 moves due to certain factors, constraint applied on the first connection thread 50 may further be reduced, further reducing a possibility of damaging the first connection thread 50 caused by the constraint of the side wall of the first rotational shaft 332.

Figure 22:
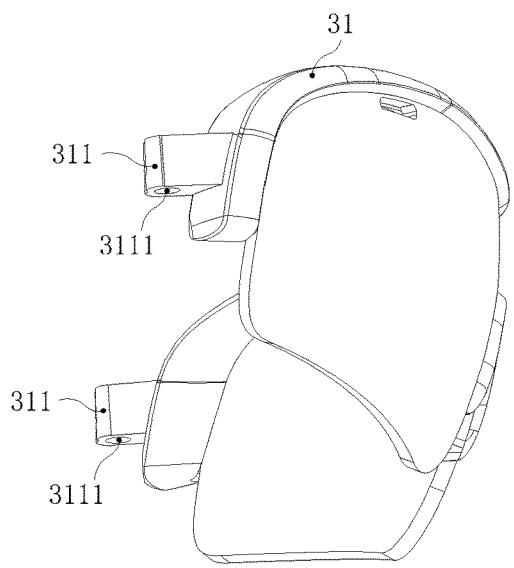
FIG. 22 is a structural schematic view of a frame and a lens of eyeglasses of a bone conductive sound generating device according to an embodiment of the present disclosure.
Figure 23:
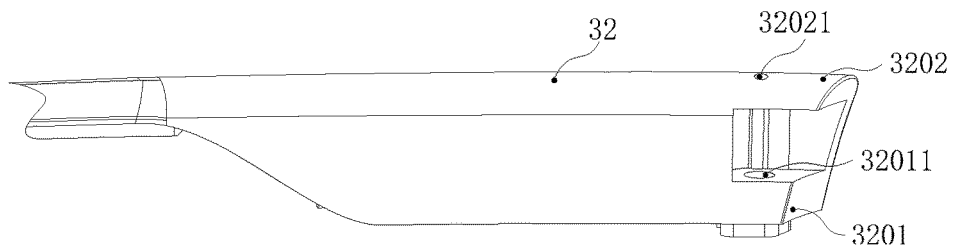
FIG. 23 is a structural schematic view of a portion of an arm of eyeglasses of a bone conductive sound generating device according to an embodiment of the present disclosure.

Further referring to FIGS. 21-23, a structural schematic view of the rim and a lens of the bone conductive sound generating device is shown in FIG. 22, and a structural schematic view of a portion of the rim of the bone conductive sound generating device is shown in FIG. 23. In the present embodiment, the first ledge 311 and the second ledge 3201 may define a first receiving hole 3111 and a second receiving hole 32011, and the first receiving hole 3111 and the second receiving hole 32011 may be coaxial. The first receiving hole 3111 and the second receiving hole 32011 may be defined to enable the first rotational shaft 332 to insert from an outside of the arm 32 through the second receiving hole 32011 to be received in the first receiving hole 3111. The first receiving hole 3111 and the second receiving hole 32011 may further be defined to enable the first rotational shaft 332 to tightly abut against an inner wall of the second receiving hole 32011 and to enable the first rotational shaft 332 be received in the first receiving hole 3111, wherein the first rotational shaft 322 and an inner wall of first receiving hole 3111 may define a gap.

To be specific, the second receiving hole 32011 may be defined to extend through the second ledge 3201. A face of the first ledge 311 facing the second receiving hole 32011 may be recessed for a certain length to define the first receiving hole 3111, and the first receiving hole 3111 may correspond to and may be fluidly coupled to the second receiving hole 32011. A diameter of the first receiving hole 3111 may be greater than a diameter of the second receiving hole 32011. An outer diameter of the first rotational shaft may be less than the diameter of the first receiving hole 3111 and greater than the diameter of the second receiving hole 32011. In such a way, the first rotational shaft 332 may be fixedly connected to the arm 32 and rotatably connected to the rim 31, such that the rim 31 and the arm 32 may rotate around the first rotational shaft 332 to be bent or unfolded relative to each other.

Further, in an embodiment, the first ledge 311 and the third ledge 3202 may define the third receiving hole 3112 and the fourth receiving hole 32021 respectively, and the third receiving hole 3112 and the fourth receiving hole 32021 may be coaxial. The third receiving hole 3112 and the fourth receiving hole 32021 may be defined to enable the second rotational shaft 333 to insert from an outside of the arm 32 through the fourth receiving hole 32021 to be received in the third receiving hole 3112. The third receiving hole 3112 and the fourth receiving hole 32021 may be defined to enable the second rotational shaft 333 to be tightly received in the third receiving hole 3112 and loosely received in the fourth receiving hole 32021. Alternatively, the third receiving hole 3112 and the fourth receiving hole 32021 may be defined to enable the second rotational shaft 333 to be loosely received in the third receiving hole 3112 and tightly received in the fourth receiving hole 32021.

In the present embodiment, the third receiving hole 3112, the fourth receiving hole 32021, the first receiving hole 3111, and the second receiving hole 32011 may be coaxial. The third receiving hole 3112 may be defined by a face of the first ledge 311 facing the third receiving hole 32011 being recessed for a certain length. In an embodiment, the first receiving hole 3111 and the third receiving hole 3112 may be coaxial and may be fluidly coupled to each other. To be specific, as described in the above embodiment, the first ledge 311 of the rim 31 may define the thread channel being fluidly coupled to the first thread opening 33213, the first receiving hole 3111 and the second receiving hole 3112 may be fluidly coupled to two ends of the thread channel in the first ledge 311 respectively. The fourth receiving hole 32021 may extend through the third ledge 3202. A diameter of the third receiving hole 3112 may be greater than a diameter of the fourth receiving hole 32021, and the outer diameter of the second rotational shaft 333 may be less than the diameter of the third receiving hole 3112 and greater than the diameter of the fourth receiving hole 32021. Alternatively, the diameter of the fourth receiving hole 32021 may be greater than the diameter of the third receiving hole 3112. In such a way, the second rotational shaft 333 may be fixedly connected to the arm 32 and rotatably connected to the rim 31. Alternatively, the second rotational shaft 333 may be fixedly connected to the rim 31 and rotatably connected to the arm 32. In such a way, the rim 31 and the arm 32 may rotate around the first rotational shaft 332 to be bent or unfolded relative to each other.

In one embodiment, the second rotational shaft 333 may be a solid shaft, and the outer diameter of the rotational shaft 333 may refer to a diameter of the second rotational shaft 333 and may be less than the outer diameter of the first rotational shaft 332. When the user is wearing the device, the second rotational shaft 333 may be arranged on a top of the arm 32, and the first rotational shaft 332 may be arranged on a bottom of the arm 32.

To be noted that, as the thread channel 331 is defined inside the first rotational shaft 332, the outer diameter of the first rotational shaft 332 may be relatively large, unable to satisfy a demand of an aesthetic appearance. Therefore, in the present embodiment, the second rotational shaft 333 having a relatively small outer diameter may be arranged, such that when the user is wearing the eyeglasses, the second rotational shaft 333 may tend to be arranged on the top of the arm and may be easily noticed by the user, and the first rotational shaft 332 may be arranged on the bottom of the arm and may not be easily noticed by the user. As the outer diameter of the second rotational shaft 333 may be relatively small, the aesthetic integral appearance of the eyeglasses may be improved to some extent.

Of course, in other embodiments, the first rotational shaft 332 and the second rotational shaft 333 may be arranged in other manners. For example, the second rotational shaft 333 may be a hollow shaft, and a diameter of the second rotational shaft 333 may be greater than a diameter of the first rotational shaft 332. Alternatively, when the user is wearing the eyeglasses, the second rotational shaft 333 may be arranged on the bottom of the arm 32, and the first rotational shaft 332 may be arranged on the top of the arm 32, which will not be limited by the present disclosure.

In addition, as shown in FIG. 19, a connection position between the end face 3322 of the first rotational shaft 332 defining the first thread opening 33213 and an inner side wall 3323 of the first rotational shaft 332 defining the thread channel 331 may be in a shape of an arc. It may be understood that, when the rim 31 and the arm 32 rotate through the rotational assembly 33, the first rotational shaft 332 may be rotatably connected to the rim 31, such that the portion of the first connection thread 50 positioned near the first thread opening 33213 may be driven to move. In the present embodiment, by arranging the connection position between the end face 3322 of the first rotational shaft 332 and the inner side wall 323 to be in the shape of the arc, when the portion of the first connection thread 50 positioned near the first thread opening 33213 moves and contacts the first rotational shaft 332, the first connection thread 50 may not be cut due to sharpness of the connection position between the end face 3322 and the inner side wall 323, such that the first connection thread 50 may further be protected.

In an embodiment, a connection position between the end face of the first rotational shaft 332 defining the second thread opening 33214 and the inner side wall 3323 of the first rotational shaft 332 defining the thread channel 331 may be in the shape of the arc. Similarly, in such a way, the first connection thread 50 may further be protected.

Figure 24:
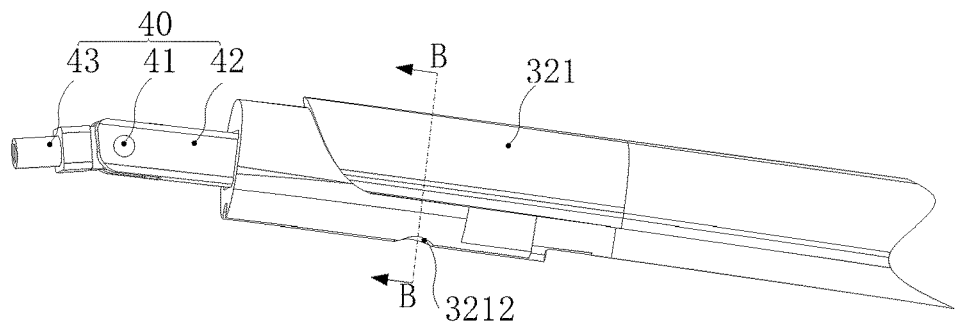
FIG. 24 is a structural schematic view of a portion of a bone conductive sound generating device according to an embodiment of the present disclosure.
Figure 25:
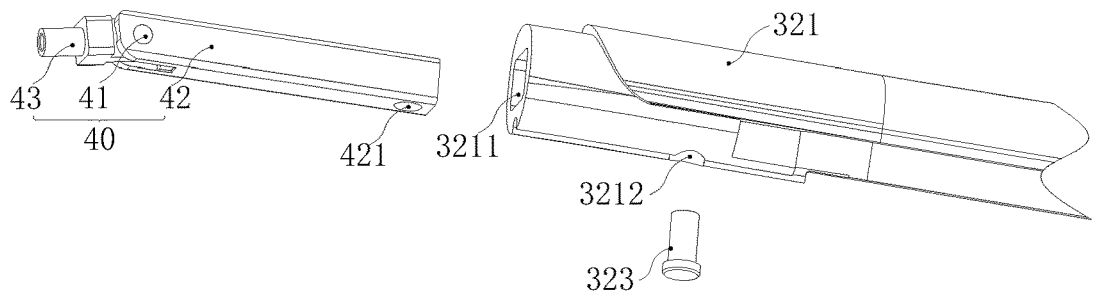
FIG. 25 is an exploded perspective view of a portion of a bone conductive sound generating device according to an embodiment of the present disclosure.

Further as shown in FIGS. 24 and 25, the hinge 40 may further include a hinge base 42 and a hinge arm 43, and the hinge arm 43 may be rotatably connected to the hinge base 42 through the hinge shaft 41.

The hinge base 42 may be connected to the body portion 321, such that the hinge 40 may be arranged at an end of the body portion 321 away from the rim 31.

To be specific, the body portion 321 may define a hinge chamber 3211 along a length direction of the body portion 321, and the hinge chamber 3211 may further extend through an end face of the body portion 321 away from the rim 31 to be fluidly coupled to an outside of the body portion 321. A side wall of the body portion 321 may define a first insertion hole 3212 being fluidly coupled to the hinge chamber 3211. An end of the hinge base 42 away from the hinge arm 43 may be inserted into the hinge chamber 3211 through the end face of the body portion 321. A fixing member 323 may be received in the first insertion hole 3212, and the end of the hinge base 42 may be fixedly received in the hinge chamber 3211 through the fixing member 323. The hinge 40 may be connected to the body portion 321.

The hinge chamber 3211 may be defined when the body portion 321 is being formed. For example, a material of the body portion 321 may be rubber, plastics, or the like. When molding is performed to form the body portion 321, the hinge chamber 3211 may be defined. A shape of the hinge chamber 3211 may fit with a shape of the hinge base 42, such that the hinge base 42 may be received in the hinge chamber 3211. In the present embodiment, the hinge base 42 may be in a shape of a long-straight rod along a length direction of the body portion 321. Correspondingly, the body portion 321 may be a straight rod along the length direction, and the hinge chamber 3211 may be defined along the straight rod. Further, the hinge base 42 may fit with and may be received in the hinge chamber 3211 to achieve configuration of the hinge 40. Of course, in other embodiments, the body portion 321 may be arranged to be in a shape of an arched rod or the like.

Further, the first insertion hole 3212 may be defined when the body portion 321 is being formed. Alternatively, after the body portion 321 is formed, a side wall of the body portion 321 may be drilled to define the first insertion hole 3212. To be specific, in the present embodiment, a shape of the first insertion hole 3212 may be circular. In other embodiments, the shape of the first insertion hole 3212 may be squared, triangular, or the like. A shape of the fixing member 323 may fit with a shape of the first insertion hole 3212, such that the fixing member 323 may be inserted into the first insertion hole 3212 from an outside of the body portion 321. Further, the fixing member 323 may enable the hinge base 42 to be fixedly received in the hinge chamber 3211 by abutting against a side wall of the hinge base 42 tightly or by extending through a side wall of the hinge base 42 to insert to an inside of the hinge base 42. To be specific, each of an inner wall of the first insertion hole 3212 and an outer wall of the fixing member 323 may be arranged with a screw thread correspondingly, such that the fixing member 323 may be threaded to be received in the first insertion hole 3212 to further enable the hinge base 42 to be received in the hinge chamber 3211. Of course, the fixing member 323 may be received in the first insertion hole 3212 by other means, such as by an interference fit.

Further, the hinge arm 43 may be connected to the connection member 322, such that after the connection member 322 is connected to the hinge arm 43, the hinge base 42 may be received in the hinge chamber 3211 of the body portion 321, such that the hinge arm 43 and the body portion 321 may rotate around the hinge shaft 41. The bone conductive speaker mechanism 20 may be connected to an end of the hinge arm 43 away from the hinge base 42, such that the bone conductive speaker mechanism 20 may be connected to the end of the body portion 321 away from the rim 31.

In the above embodiment, the body portion 321 defines the hinge chamber 3211 extending through the end face of the body portion 321 to be coupled to the outside of the body portion 321. The hinge 40 may be received in the hinge chamber 3211 through the hinge base 42. The fixing member 323 may extend through the side wall of the body portion 321 via the first insertion hole 3212. In such a way, the hinge base 42 received in the hinge chamber 3211 may be fixedly received in the hinge chamber 3211, such that the hinge 40 may be detachable from the body portion 321, and the bone conductive speaker mechanism 20, the rim 31, the body portion 321, or other components may be replaced if damaged.

Further, as shown in FIG. 25, in one embodiment, the hinge base 42 defines a second insertion hole 421 corresponding to the first insertion hole 3212, and the fixing member 323 may further be inserted into the second insertion hole 421.

To be specific, a shape of the second insertion hole 421 may fit with the fixing member 323, such that after the fixing member 323 extends through the first insertion hole 3212, the fixing member 323 may further be inserted into the second insertion hole 421 to fix the hinge base 42. In such a way, the hinge base 42 may not falter inside the hinge chamber 3211, and the hinge 40 may be fixed more stably. To be specific, being similar to the fixing member 323 being received in the first insertion hole 3212, an inner wall of the second insertion hole 421 may be arranged with a screw thread corresponding to the screw thread arranged on the outer wall of the fixing member 323, such that the fixing member 323 may be threaded to connect to the hinge base 42. Alternatively, the hinge base 42 may have an outer wall corresponding to the inner wall of the second insertion hole 421 at which contacts the outer wall of the fixing member 323, and the surface of the corresponding outer wall may be smooth. The fixing member 323 may have an interference fit with the inner wall of the second insertion hole 421, which will not be limited by the present embodiment.

Further, the second insertion hole 421 may extend through two opposite sides of the hinge base 42, such that the fixing member 323 may further extend through the entire hinge base 42, and the hinge base 42 may be fixedly received in the hinge chamber 3211 more stably.

Figure 26:
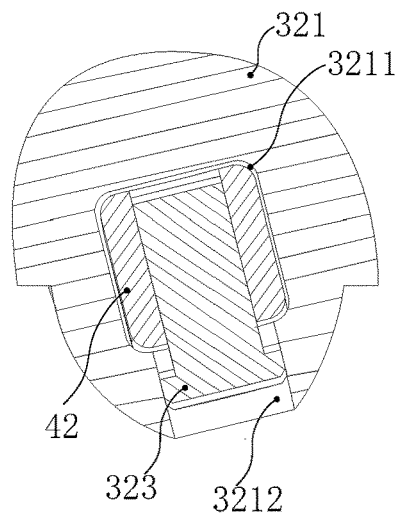
FIG. 26 is a cross-sectional view of the bone conductive sound generating device shown in FIG. 24, taken along a line B-B.

Further referring to FIG. 26, in the present embodiment, a cross-sectional plane perpendicular to the length direction of the body portion 321 may be defined, a shape of a cross section of the hinge base 42 taken along the cross-sectional plane may fit with a shape of the hinge chamber 3211 taken along the cross-sectional plane, such that after the fixing member 323 is inserted, the hinge base 42 and the body portion 321 may be engaged to form a seal.

Taken along the cross-sectional plane shown in FIG. 26, the shape of the hinge base 42 and the shape of the hinge chamber 3211 may not be limited by the present disclosure, with the proviso that the hinge base 42 able to be inserted into the hinge chamber 3211 from the end face of the body portion 321 away from the hinge arm 43. Further, the first insertion hole 3212 may be defined on the side wall of the hinge chamber 3211 and extend through the side wall of the hinge chamber 3211 to be fluidly coupled to the hinge chamber 3211.

In an embodiment, the cross section of the hinge base 42 taken along the cross-sectional plane and the cross section of the hinge chamber 3211 taken along the cross-sectional plane may be in a shape of rectangle, and the first insertion hole 3212 may be defined to be perpendicular to a side of the rectangle.

To be specific, in the present application scenario, a fillet may be arranged on the outer wall of the hinge base 42 or the inner wall of the hinge chamber 3211, such that the hinge base 42 may contact the hinge chamber 3211 more smoothly, enabling the hinge base 42 to be easily inserted into the hinge chamber 3211.

To be further noted that, before configuring the hinge 40, a certain volume of air may be received in the hinge chamber 3211. Therefore, when the hinge chamber 3211 defines only one opening being fluidly coupled to the external environment, the air in the hinge chamber 3211 may be difficult to be expelled out when the hinge base 42 is being inserted into the hinge chamber 3211, affecting the configuration. In the present embodiment, the first insertion hole 3212 may extend through the side wall of the hinge chamber 3211 to be fluidly coupled to the hinge chamber 3211, such that in a process of configuration, the air inside the hinge chamber 3211 may be expelled out through the first insertion hole 3212, enabling the hinge 40 to be configured normally and easily.

Figure 27:
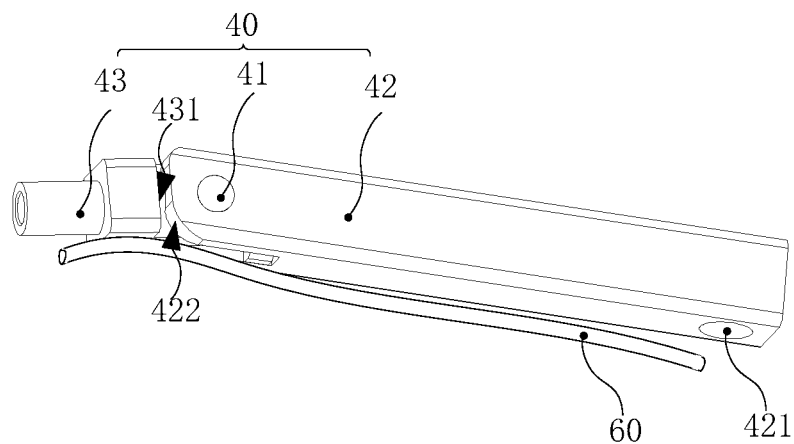
FIG. 27 is a structural schematic view of a portion of a bone conductive sound generating device according to an embodiment of the present disclosure.

Further referring to FIG. 27, in some embodiments, the bone conductive sound generating device may further include a second connection thread 60 arranged on an outside of the hinge 40.

Similar to the first connection thread 50, the second connection thread 60 may be a thread for electrical connection and/or mechanical connection. In the present embodiment, the hinge 40 and the like may be configured to connect the bone conductive speaker mechanism 20 to the end of the body portion 321 away from the rim 31. A control circuit related to the bone conductive speaker mechanism 20 may be arranged in the body portion 321. Under such the situation, the second connection thread 60 may be configured to connect the bone conductive speaker mechanism 20 to the control circuit in the body portion 321. To be specific, the second connection thread 60 may be disposed on a side of the hinge base 42 and the hinge arm 43. The second connection thread 60 and the hinge 40 may be received in a same space. The second connection thread 60 and the first connection thread 50 may be connected or independent from each other.

Further, the hinge base 42 may include a first end face 422, and the hinge arm 43 may include a second end face 431 facing to the first end face 422. It may be understood that, a gap may be defined between the first end face 422 and the second end face 431, such that the hinge base 42 and the hinge arm 43 may rotate relative to each other around the hinge shaft 41. In the present embodiment, when the hinge arm 43 and the hinge base 42 are rotating relative to each other, a relative position between the first end face 422 and the second end face 431 may be changed correspondingly, such that the gap between the first end face 422 and the second end face 431 may be increased or decreased.

In the present embodiment, the gap between the first end face 422 and the second end face 431 may always be greater or less than a diameter of the second connection thread 60. In such a way, the second connection thread 60 disposed on the outside of the hinge 40 may not be clamped into the gap between the first end face 422 and the second end face 431 when the hinge base 42 and the hinge arm 43 are rotating relative to each other, such that a damage to the second connection thread 60 may be reduced. To be specific, while the hinge arm 43 and the hinge base 42 are rotating relative to each other, a ratio of the gap between the first end face 422 and the second end face 431 to the diameter of the second connection thread 60 may be maintained to be greater than 1.5 or less than 0.8 at all times, such as greater than 1.5, 1.7, 1.9, 2.0, and the like, or less than 0.8, 0.6, 0.4, 0.2, or the like, which will not be limited by the present disclosure.

Figure 28:
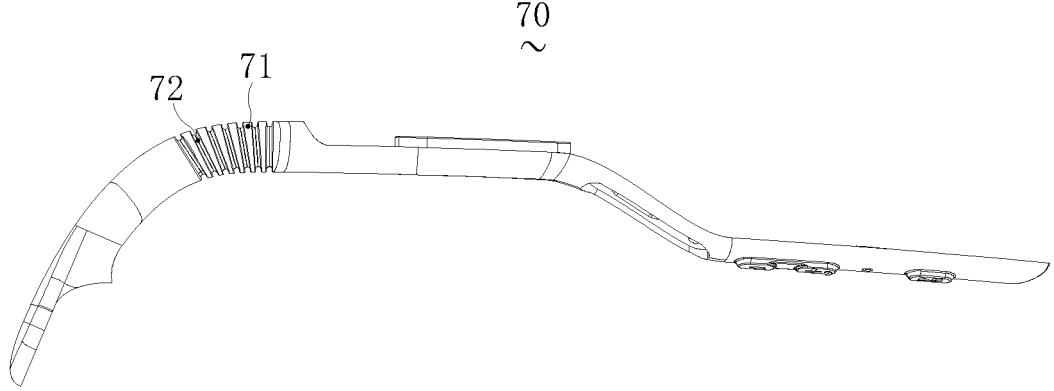
FIG. 28 is a schematic view of an original state of a protective case of a bone conductive sound generating device according to an embodiment of the present disclosure.
Figure 29:
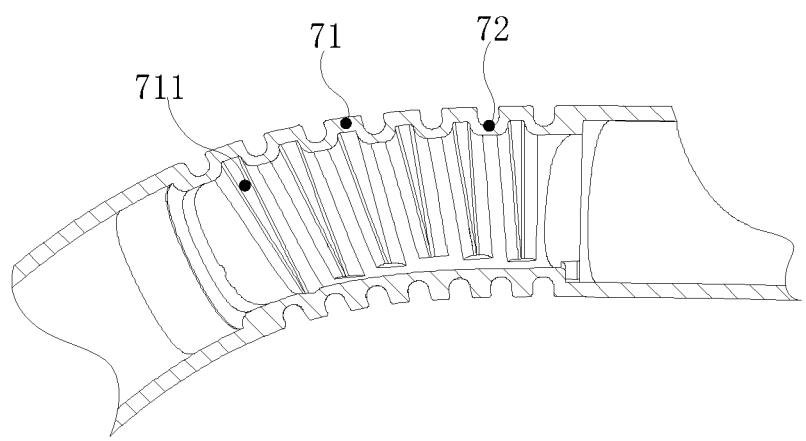
FIG. 29 is a cross-sectional view of a portion of a protective case in an original state of a bone conductive sound generating device according to an embodiment of the present disclosure.
Figure 31:
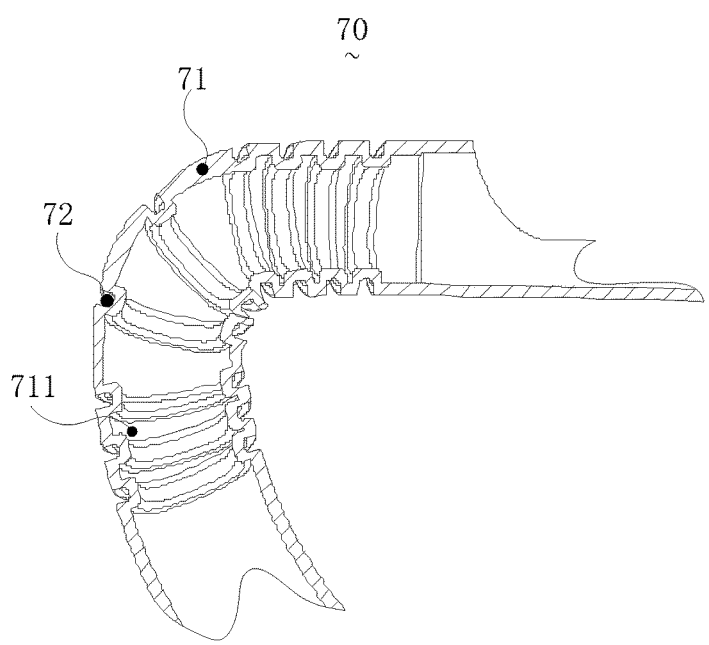
FIG. 31 is a cross-sectional view of a portion of a protective case of a bone conductive sound generating device in a bent state according to an embodiment of the present disclosure.

In some embodiments, the bone conductive sound generating device may further include a protective case 70. As shown in FIGS. 4, 28, and 31, the protective case 70 may be configured to encase an outer side of the hinge 40 and may be bent as the hinge 40 is bent. The protective case 70 may include a plurality of ring-shaped ridges 71 and a plurality of ring-shaped connection portions 72. The plurality of ring-shaped ridges 71 may be arranged along a length direction of the protective case 70 and spaced apart from each other. The plurality of ring-shaped connection portions 72 may be arranged between two adjacent ridges 71 and connect the two adjacent ridges 71. A thickness of a wall of each ridge 71 may be greater than a thickness of a wall of each connection portion 72.

The length direction of the protective case 70 may be the same as the length direction of the hinge 40. The protective case 70 may be arranged along a length direction of the hinge base 42 and the hinge arm 43. The protective case 70 may be made of soft materials, such as soft silicon, rubber, and the like.

The ring-shaped ridge 71 may be formed by an outer wall of the protective case 70 protruding to an outside, and a shape of an inner wall of the protective case 70 corresponding to the ridge 71 may not be limited by the present disclosure. For example, the surface of the inner wall may be smooth or recessed at a position corresponding to the ridge 71.

The ring-shaped connection portion 72 may be configured to connect the two adjacent ring-shaped ridges 71. To be specific, the connection portion 72 may be configured to connect to an edged region of the ridge 71 close to an inside of the protective case 70, such that the outer side of the protective case 70 may have recesses relative to the ridges 71.

To be specific, the number of the ring-shaped ridges 71 and the number of the ring-shaped connection portions 72 may be determined according to actual needs, such as according to a length of the protective case 70, a width of the ring-shaped ridges 71 along the length direction of the protective case 70, a width of the ring-shaped connection portions 72 along the length direction of the protective case 70, and the like.

Further, the thickness of the wall of the ring-shaped ridge 71 may refer to a distance between the inner wall of the protective case 70 and the outer wall of the protective case 70 at a position corresponding to the ridge 71, and the thickness of the wall of the ring-shaped connection portion 72 may refer to a distance between the inner wall of the protective case 70 and the outer wall of the protective case 70 at a position corresponding to the connection portion 72. In the present embodiment, the thickness of the wall of the ring-shaped ridge 71 may be greater than the thickness of the wall of the ring-shaped connection portion 72.

Figure 30:
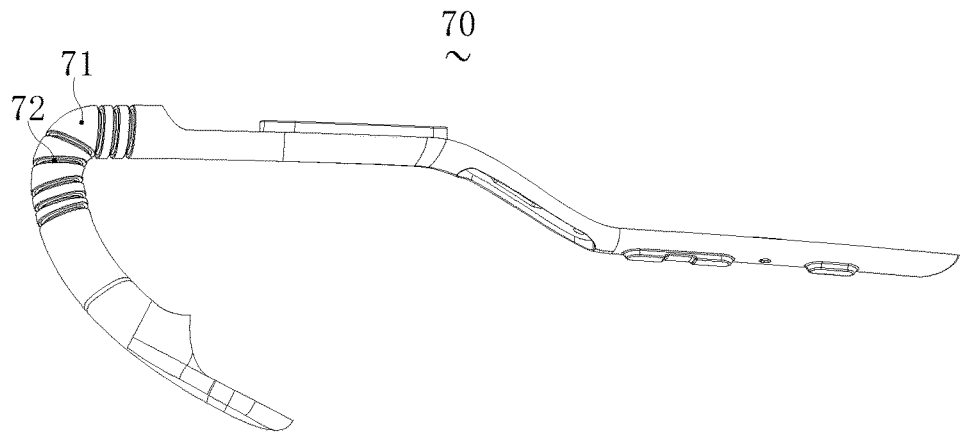
FIG. 30 is a schematic view of a protective case of a bone conductive sound generating device in a bent state according to an embodiment of the present disclosure.

It may be understood that, when the hinge base 42 and the hinge arm 43 of the hinge 40 rotate relative to each other around the hinge shaft 41, an angle between the hinge base 42 and the hinge arm 43 may be changed, such that the protective case 70 may be bent, as shown in FIG. 30 and FIG. 31. To be specific, when the protective case 70 is bent as the hinge 40 is bent, a bent region of the protective case 70 may be formed, a portion of the ring-shaped ridge 71 and a portion of the ring-shaped connection portion 72 may be arranged at an outer region of the bent region and may be stretched. Another portion of the ring-shaped ridge 71 and another portion of the ring-shaped connection portion 72 may be arranged at an inner region of the bent region and may be compressed.

In the present embodiment, the thickness of the wall of the ring-shaped ridge 71 may be greater than the thickness of the wall of the ring-shaped connection portion 72, such that the ring-shaped ridge 71 may be more rigid than the ring-shaped connection portion 72. In such a way, when the protective case 70 is bent, the portion of the ring-shaped ridge arranged at the outer region of the bent region may be stretched, and the ring-shaped ridge 71 may provide a support of certain strength to the protective case 70. At the same time, the another portion of the ring-shaped ridge 71 arranged at the inner region of the bent region may be compressed, and the ring-shaped ridge 71 may be resistant to compression to some extent. In such a way, the protective case 70 may be protected, stability of the protective case 70 may be improved, and a service life of the protective case 70 may be increased.

Further, it may be noted that, a shape of the protective case 70 may be consistent with a state of the hinge 40. In an embodiment, the protective case 70 may be stretched or compressed along the length direction of the protective case 70, and two sides of the protective case 70 rotating around the rotational shaft may be stretched or compressed. In another embodiment, the hinge base 42 and the hinge arm 43 of the hinge 40 may be configured to rotate around the hinge shaft 41 within a range of 180°. In other words, the protective case 70 may be configured to be bent towards only one side, and that is, only one of the two sides of the protective case 70 along the length direction of the protective case 70 may be compressed, and the other one of the two sides may be stretched only. Under such the situation, based on different forces applied to the two sides of the protective case 70, the two sides of the protective case 70 may be configured to have different structures.

In an embodiment, when the protective case 70 is bent, a width of the portion of the ring-shaped ridge 71 arranged at the outer region of the bent region along the length direction of the protective case 70 may be greater than a width of the another portion of the ring-shaped ridge 71 arranged at the inner region of the bent region along the length direction of the protective case 70.

Along the length direction of the protective case 70, increasing the width of the ring-shaped ridge 71 may further increase rigidity of the protective case 70. At the same time, in the present embodiment, an initial angle between the hinge base 42 and the hinge arm 43 may be less than 180°. The initial angle may refer to an angle between the hinge base 42 and the hinge arm 43 when the bone conducted sound generating device serves as eyeglasses only, and the bone conducted speaker mechanism 20 does not adhere to and fit with the back of the auricle. Under such the situation, when the ring-shaped ridge 71 of the protective case 70 is arranged to have an even width, the protective case 70 may be compressed at an initial state. The initial state may refer to a state of the bone conducted sound generating device serving as eyeglasses only and the bone conducted speaker mechanism 20 not adhering to and fitting with the back of the auricle. In the present embodiment, in a bent state, the width of the portion of the ring-shaped ridge 71 arranged at the outer region of the bent region may be relatively large, such that a length of a portion of the protective case 70 at the outer region of the bent region may be increased. In such a way, the rigidity of the protective case 70 may be increased, and when the protective case 70 is bent, a stretched side may be less stretched. At the same time, when the protective case 70 is in the bent state, the width of the another portion of the ring-shaped ridge 71 arranged at the inner region of the bent region may be relatively small, increasing a space for the compressed ring-shaped connection portion 72 along the length direction of the protective case 70, such that the compression applied to the compressed side of the protective case 70 may be relieved to some extent.

Further, in an embodiment, the width of the ring-shaped ridge 71 gradually decreases from the portion of the ring-shaped ridge 71 arranged at the outer region of the bent region to the another portion of the ring-shaped ridge 71 arranged at the inner region of the bent region, such that when the protective case 70 is in the bent state, the width of the portion of the ring-shaped ridge 71 arranged at the outer region of the bent region is greater than the width of the another portion of the ring-shaped ridge 71 arranged at the inner region of the bent region.

It may be understood that, the ring-shaped ridge 71 may be configured to surround the outer side of the protective case 70. Along the length direction of the protective case 70, a side of the protective case 70 may correspond to a stretched side, and another side of the protective case 70 may correspond to a compressed side. In the present embodiment, the width of the ring-shaped ridge 71 may gradually decrease from the portion of the ridge 71 arranged at the outer region of the bent region to the another portion of the ridge 71 arranged at the inner region of the bent region, such that the width of the protective case 70 may be relatively uniform, the stability of the protective case 70 may be increased to some extent.

In one embodiment, when the protective case 70 is in the bent state, the inner wall of the protective case 70 corresponding to the portion of the ring-shaped ridge 71 arranged at the outer region of the bent region may define a recess 711.

To be specific, in the present embodiment, the recess 711 may be defined to extend perpendicular to the length direction of the protective case 70, such that the corresponding ridge 71 may be spread properly along the length direction of the protective case 70 when being stretched.

According to the above description, when the protective case 70 is in the bent state, the outer region of the bent region of the protective case 70 may be in a stretched state. In the present embodiment, the inner wall of the protective case 70 corresponding to the ring-shaped ridge 71 may define the recess 711. In such a way, when the protective case is stretched, the ring-shaped ridge 71 corresponding to the recess 711 may spread properly to resist stretching to some extent, such that a stretching force applied to the side of the protective case may be reduced, such that the protective case 70 may be protected.

To be noted that, when the protective case is in the bent state, the inner wall of the protective case 70 corresponding to the another portion of the ring-shaped ridge 71 arranged at the inner region of the bent region may not define the recess 711. In an embodiment, a width of the ridge 71 along the length direction of the protective case 70 may gradually decrease from the portion arranged at the outer region of the bent region to the another portion arranged at the inner region of the bent region. In such a way, in the inner wall of the protective case 70 corresponding to the ring-shaped ridge 71 arranged at the inner region of the bent region may not define the recess 711.

To be specific, the protective case 70 may connect the body portion 321 to the bone conductive speaker mechanism 20, and the body portion 321 and the bone conductive speaker mechanism 20 may be arranged at two sides of the protective case 70 along the length direction of the protective case 70. In an embodiment, the protective case 70 and other structures of the bone conductive sound generating device, such as a protective cover of some components, may be configured as an overall structure, such that the bone conductive sound generating device may be sealed and integral.

To be specific, as shown in FIGS. 32 to 36, in some embodiments, the hinge arm 43 of the hinge 40 may have a first support face 432 and a second support face 433 connected with each other. The hinge 40 may further include a supportive member 44 and an elastic member 45. The supportive member 44 may be movably arranged on the hinge base 42 and may have a third support face 441. The elastic member 45 may be configured to offset the supportive member 44 towards the hinge arm 43, such that the third support face 441 may elastically abut against the first support face 432 and the second support face 433.

When the external force is applied to the bone conductive speaker mechanism 20 or the connection member 322 to drive the hinge arm 43 to rotate relative to the hinge base 42, a connective position 434 between the first support face 432 and the second support face 433 may push the supportive member 44 to overcome offsetting of the elastic member 45 to move away from the hinge arm 43, such that the third support face 441 may be switched from elastically abutting against one of the first support face 432 and the second support face 433 to elastically abutting against the other one of the first support face 432 and the second support face 433.

In an embodiment, the supportive member 44 may be configured to connect to an end of the elastic member 45 facing towards the hinge arm 43, and may enable the third support face 441 to face the hinge arm 43. When the hinge arm 43 is driven by an external force to rotate around the hinge shaft 41 relative to the hinge base 42, the third support face 441 may be driven to enable the supportive member 44 to compress the elastic member 45, and the supportive member 44 may further be offset by the elastic member 45. Of course, the supportive member 44 may not be connected to the elastic member 45, but may abut against a side of the elastic member 45, with the proviso of the supportive member 44 able to be offset.

The first support face 432 and the second support face 433 may be two adjacent side faces of the hinge arm 43 being at least partially parallel to a central axis of the hinge shaft 41. Alternatively, the first support face 432 and the second support face 433 may be a portion of the two adjacent side faces. When the hinge arm 43 rotates relative to the hinge base 42, the first support face 432 and the second face 433 may rotate along with the hinge arm 43 around the hinge shaft 41, such that different side faces of the hinge arm 43 may face the hinge base 42, such that the hinge arm 43 may have various relative position relationships with the hinge base 42.

In addition, the elastic member 45 may be an element able to provide an elastic force and able to be compressed along a direction of the elastic force to provide a compression space. For example, the elastic member 45 may be a spring. An end of the spring may abut against the supportive member 44. When the third support face 441 of the supportive member 44 is pushed by the elastic member 45, the elastic member 45 may resist against the supportive member 44 and may be compressed to provide a space for the third support face 441 of the supportive member 44 along a facing direction of the third support face 441. In such a way, when a relative position of the hinge shaft 41 remains unchanged, a sufficient space may be provided to enable different side faces of the hinge arm 43 to rotate to reach a position between the hinge shaft 41 and the third support face 441.

To be specific, when the hinge arm 43 rotates relative to the hinge base 42, the relative position of the hinge shaft 41 may not be changed, and the contact position between the hinge arm 43 and the third support face 441 of the hinge base 42 may be changed. As distances between various positions of the hinge arm 43 and the hinge shaft 41 may be various, when various positions of the hinge arm 43, such as various positions of the first support face 432 and the second support face 433, contact the third support face 441, spaces required between the hinge shaft 41 and a contact point between the hinge arm 43 and the third support face 441 may be various. Due to limitation of the elastic force and the space, a space provided by compression of the elastic member 45 may be limited. Therefore, when the hinge arm 43 is rotating relative to the hinge base 42, and when a distance between a position on a cross-sectional plane perpendicular to the central axis of the hinge shaft 41 and the hinge shaft 41 is excessively large, the position may be held on another position on the third support face in the process of rotating, such that the hinge arm 43 may not rotate continually. In such a way, the hinge arm 43 and the hinge base 42 may be rotate within a certain range only. In an embodiment, when the hinge arm 43 and the hinge base 42 are rotating relative to each other around the hinge shaft 41, only a region corresponding to the first support face 432 and the second support face 433 and a region corresponding to the connective position 434 between the first support face 432 and the second face 433 may abut against the third support face 441.

Further, in the present embodiment, the first support face 432 and the second support face 433 may be flat. The hinge 40 may have two relatively stable states. One of the two states may be the third support face 441 abutting against the first support face 432, and the other one of the two states may be the third support face 441 abutting against the second support face 433.

Of course, in the present embodiment, the first support face 432 and the second support face 433 may be curved faces having certain curvatures, or may include various sub-support faces, with the proviso of enabling the hinge arm 43 and the hinge base 42 to correspondingly have at least two relatively stable states, which will not be limited by the present disclosure. In addition, the hinge arm 43 may be arranged to have other support faces, such that when the hinge arm 43 is driven by the external force to rotate relative to the hinge base 42 around the hinge shaft 41, various support faces of the hinge arm 43 may elastically abut against the third support face 441, such that the hinge arm 43 and the hinge base 42 may have various relative position relationships, which will not be limited by the present disclosure.

Figure 32:
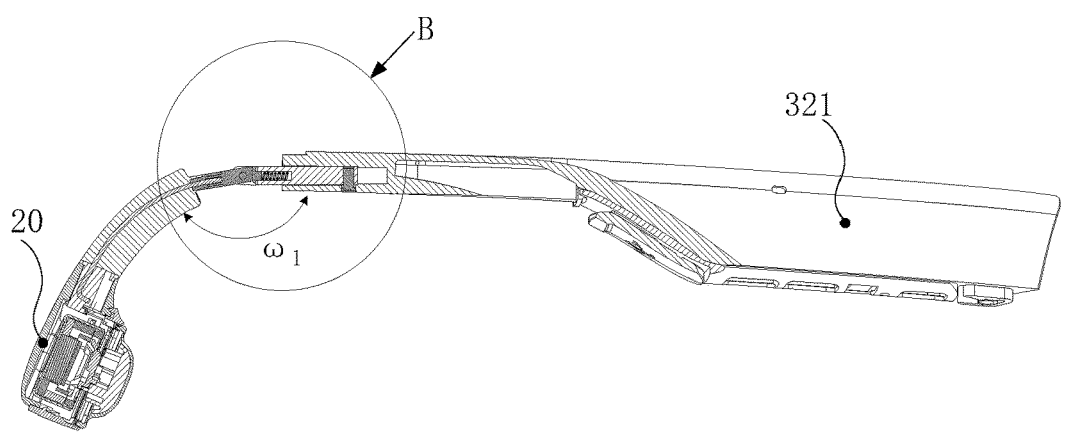
FIG. 32 is a cross-sectional view of a portion of a bone conductive sound generating device according to an embodiment of the present disclosure.
Figure 33:
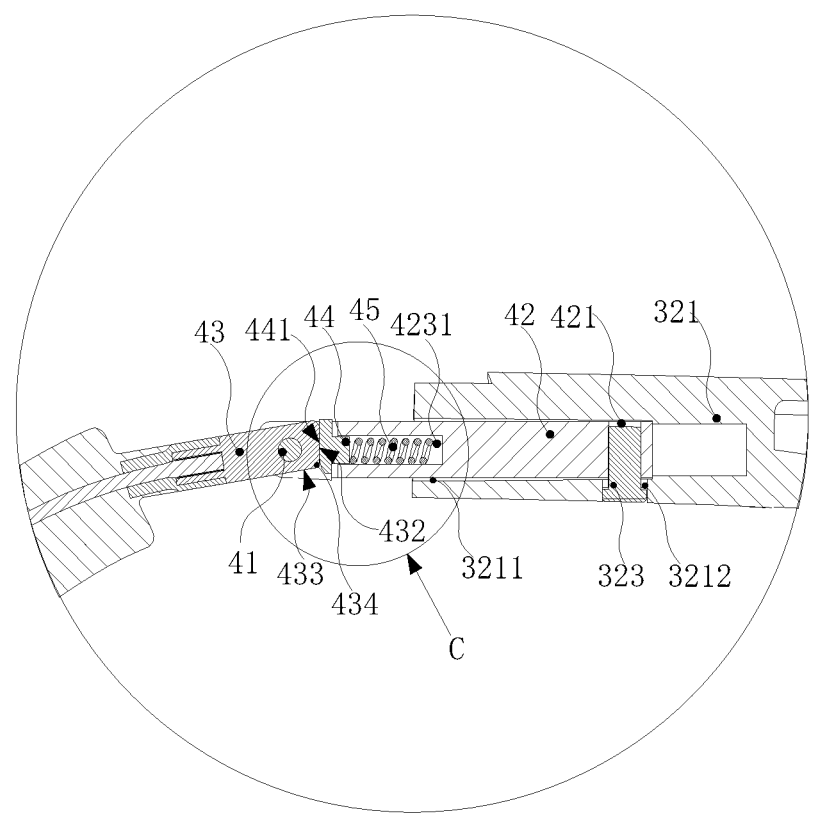
FIG. 33 is an enlarged view of a portion B shown in FIG. 32.

To be specific, an initial state being the first support face 432 abutting against the third support face 441 of the supportive member 44 may be taken as an example, as shown in FIGS. 32 and 33. Under such the situation, the elastic member 45 may be elastically compressed and deformed in the initial state, which will not be limited by the present disclosure. When the hinge 40 receives the external force to enable the hinge arm 43 to rotate relatively to the hinge base 42 around the hinge shaft 41 to allow the second support face 443 to move close to the third support face 441 gradually, the connective position 434 between the first support face 432 and the second support face 433 may contact the third support face 441. As a distance between the connective position 434 and the hinge shaft 41 is greater than a distance between the first support face 432 and the hinge shaft 41, the connective position 434 may abut against the supportive member 44 and drive the supportive member 44 to move towards the elastic member 45, such that the elastic member 45 may be compressed to resist a driving force. When the hinge arm 43 further receives the external force, the connective position 434 may move close to a region of the hinge shaft 41 gradually, and the region may be between the hinge shaft 41 and the third support face 441. In the above-mentioned process, the distance between the hinge shaft 41 and the third support face 441 may be gradually increased. It may be understood that, when a connection line between the connective position 434 and the hinge shaft 41 is perpendicular to the third support face 441, along the cross-sectional plane perpendicular to the central axis of the hinge shaft 41, the distance between the hinge shaft 41 and the third support face 441 may be equal to the distance between the hinge shaft 41 and the connective position 434. Under such the situation, the hinge shaft 41 may be at a position having a greatest distance away from the third support face 441. When the hinge 40 further receives the external force, the distance between the hinge shaft 41 and the third support face 441 may be gradually decreased, such that the space required by compressing the elastic member 45 may be reduced, enabling the elastic member 45 to release the elastic force gradually and to be restored gradually. When the connective position 434 departs away from the third support face 441 to enable the second support face 433 to abut against the third support face 441, a switching from the first support face 432 abutting against the third support face 441 into the second support face 433 abutting against the third support face 441 may be achieved.

Figure 35:
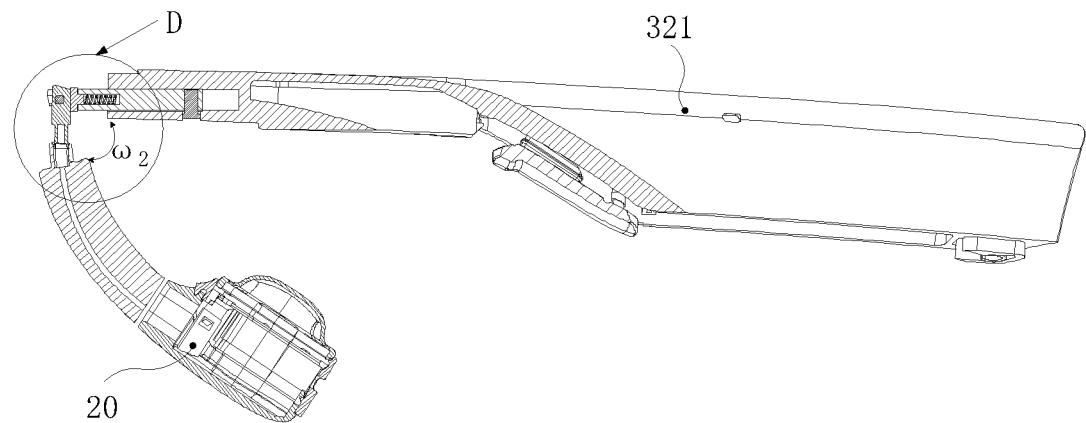
FIG. 35 is a cross-sectional view of a portion of a bone conductive sound generating device according to an embodiment of the present disclosure.
Figure 36:
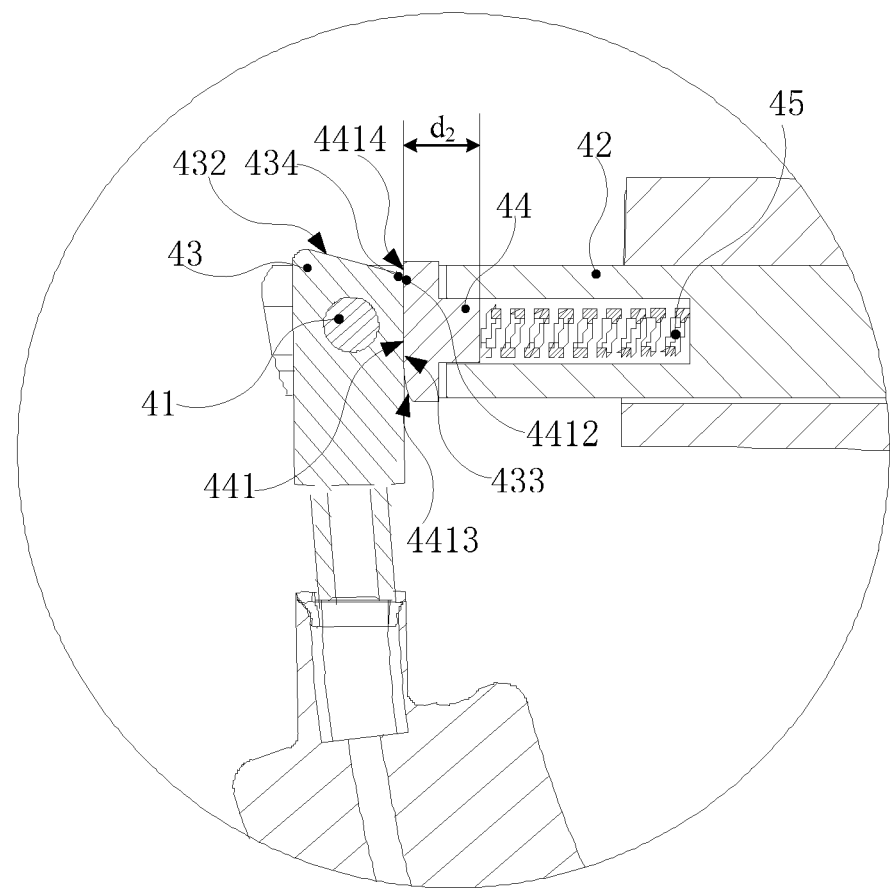
FIG. 36 is an enlarged view of a portion D shown in FIG. 35.

Similarly, when the initial state is the second support face 433 abutting against the third support face 441 of the supportive member 44, a process of switching from such the initial state to a state of the first support face 432 abutting against the third support face 441 of the supportive member 44 (as shown in FIGS. 35 and 36) may be similar to the above description.

To be noted that, when the third support face 441 is switched from abutting against one of the first support face 432 and the second support face 433 into abutting against the other one of the first support face 432 and the second support face 433, the hinge 40 may drive the bone conductive speaker mechanism 20 and the body portion 321 to switch between a first fixed relative position and a second fixed relative position, and may enable the bone conductive speaker mechanism 20 to adhere to and fit with the back of the auricle when the bone conductive speaker mechanism 20 and the body portion 321 are at the first fixed relative position.

In the present embodiment, the distance between the hinge shaft 41 and the connective position 434 is greater than a vertical distance between the hinge shaft 41 and the first support face 432 and a vertical distance between the hinge shaft 41 and the second support face 433. In such a way, when switching from the third support face 441 abutting against one of the first support face 432 and the second support face 433 into the third support face 441 abutting against the other one of the first support face 432 and the second support face 433, a state of the hinge 40 may be changed promptly.

Taking switching from the first support face 432 abutting against the third support face 441 into the second support face 433 abutting against the third support face 441 as an example, when a ratio of a maximum distance $h_1$ between the hinge shaft 41 and the connective position 434 to a minimum distance $h_2$ between the hinge shaft 41 and the first support face 432 varies, an extent of the prompt change of the hinge 40 in a process of switching may be varied.

In an embodiment, on the cross-sectional plane perpendicular to the central axis of the hinge shaft 41, the ratio of the maximum distance $h_1$ between the hinge shaft 41 and the connective position 434 to the minimum distance $h_2$ between the hinge shaft 41 and the first support face 432 may be in a range between 1.1 and 1.5.

To be specific, the hinge 41 may be configured at a position away from the second support face 433 and close to a side of the hinge arm 43 opposing to the second support face 433. In such a way, the maximum distance $h_1$ between the hinge shaft 41 and the connective position 434 being greater than the minimum distance $h_2$ between the hinge shaft 41 and the first support face 432 may be achieved, meeting the above-mentioned criteria.

To be noted that, when the ratio of $h_1$ to $h_2$ is excessively large, the prompt change may be obvious, but a relatively large force may be applied to switch from the first support face 432 abutting against the third support face 441 into the second support face 433 abutting against the third support face 441, and it may be inconvenient to use the device. In the present embodiment, setting the ratio of $h_1$ to $h_2$ to be between 1.1 and 1.5 may enable the third support face 441 to be switched from elastically abutting against the first support face 432 into elastically abutting against the second support face 433, and the prompt change of the hinge 40 may be obvious. Therefore, when the device is in use, the user may apparently feel the hinge 40 being pulled, and at the same time, the prompt change may not be excessively abrupt such that the user may have difficulty to switch states of the hinge 40.

In an embodiment, the ratio of $h_1$ to $h_2$ may be between 1.2 and 1.4. To be specific, the ratio of $h_1$ to $h_2$ may be 1.1, 1.2, 1.3, 1.4, 1.5, and the like, which will not be limited by the present disclosure.

In addition, positions at which the first support face 432 and the second support face 433 are arranged on the hinge arm 43 may affect the angle between the hinge arm 43 and the hinge base 42 when the third support face 441 abuts against one of the first support face 432 and the second support face 433. Therefore, according to requirements of users, the first support face 432 and the second support face 433 may be arranged at various positions of the hinge arm 43. The angle between the hinge arm 43 and the hinge base 42 may be shown in FIGS. 32 and 35. An angle $\omega_1$ may be the angle between the hinge arm 43 and the hinge base 42 when the third support face 441 abuts against the first support face 432, and an angle $\omega_2$ may be the angle between the hinge arm 43 and the hinge base 42 when the third support face 441 abuts against the second support face 433. In an embodiment, each of the hinge arm 43 and the hinge base 42 may be in a certain length. The hinge arm 43 may be configured at an end of the hinge base 42 along the length direction of the hinge base 42. The first support face 432 may be arranged on an end of the hinge arm 43 close to the hinge base 42 along the length direction of the hinge arm 43. The second support face 433 may be arranged on an end of the hinge arm 43 along a width direction of the hinge arm 43, and may extend parallelly to the central axis of the hinge shaft 41. Under such the situation, when the third support face 441 elastically abuts against the first support face 432, the angle between the hinge arm 43 and the hinge base 42 may reach a maximum. When the third support face 441 elastically abuts against the second support face 433, the angle between the hinge arm 43 and the hinge base 42 may reach a minimum. In such a way, when the third support face 441 elastically abutting against the first support face 432 is switched into the third support face 441 elastically abutting against the second support face 433, the angle between the hinge base 42 and the hinge arm 12 may be decreased from $\omega_1$ to $\omega_2$.

It may further be noted that, when the third support face 441 elastically abutting against the first support face 432 is switched into the third support face 441 elastically abutting against the second support face 433, a direction of a force applied to the hinge arm 43 may be consistent with a direction of gravity of the hinge arm 43. Switching states may enable the angle between the hinge base 42 and the hinge arm 43 to decrease. In the present embodiment, the ratio of $h_1$ to $h_2$ may be set to prevent the angle between the bone conductive speaker mechanism 20 and the hinge base 42 from being reduced caused by the gravity of the hinge arm 43 when the third support face elastically abuts against the first support face 432.

Figure 34:
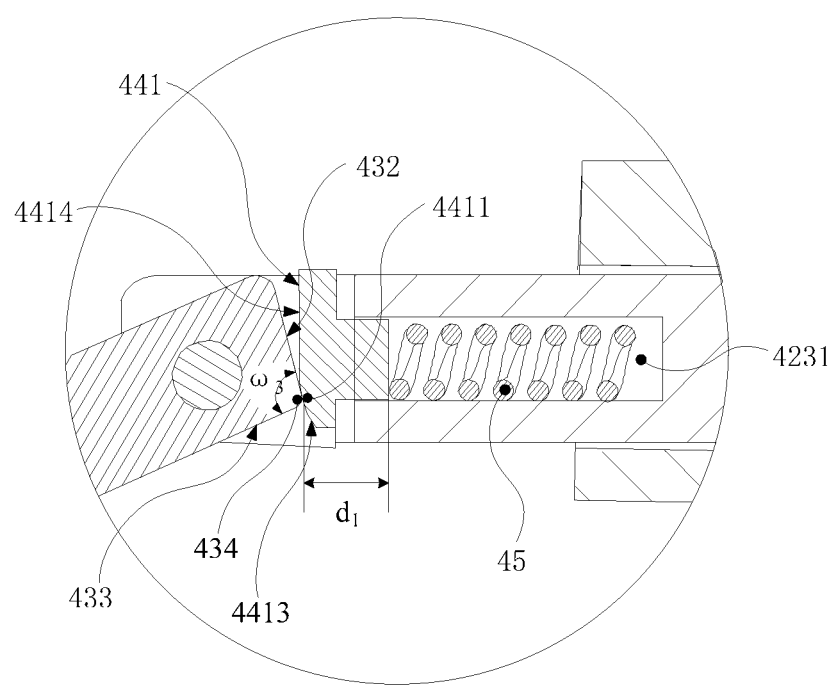
FIG. 34 is an enlarged view of a portion C shown in FIG. 33.

In an embodiment of the bone conductive sound generating device of the present disclosure, as shown in FIG. 34, on the cross-sectional plane perpendicular to the central axis of the hinge shaft 41, an angle $\omega_3$ between the first support face 432 and the second support face 433 may be an obtuse angle.

When a state of the hinge 40 is switched by switching the third support face 441 elastically abutting against the first support face 432 into the third support face 441 elastically abutting against the second support face 433, the smaller the $\omega_3$ between the first support face 432 and the second support face 433, the greater a relative rotational angle between the hinge base 42 and the hinge arm 43 may be required while switching states. In other words, when the hinge base 42 is fixed, the user may need to rotate the hinge arm 43 for a relatively large angle to switch the state of the hinge 40. Therefore, the user may apply a greater force, and the user may not be able to use the device conveniently.

As the hinge arm 43 may have a certain length, the first support face 432 may be arranged on the end of the hinge arm 43 along the length direction of the hinge arm 43, and the second support face 433 may be arranged adjacent to the first support face 432 and arranged along the width direction of the hinge arm 43. Typically, the first support face 432 and the second support face 433 may be perpendicular to each other. When the hinge 40 is switched between the above-mentioned two states, the hinge arm 43 may be rotated for 90° relative to the hinge base 42.

In the present embodiment, on the cross-sectional plane perpendicular to the hinge shaft 41, the anglew3 between the first support face 432 and the second support face 433 may be an obtuse angle, such that when the hinge 40 is switched between the two states, the hinge arm 43 may be rotated for less than 90° relative to the hinge base 42. To be specific, the hinge 40 may be configured to connect the body portion 321 with the bone conductive speaker mechanism 20. When the hinge 40 is in a second state of which the second support face 433 elastically abuts against the third support face 441, the bone conductive speaker mechanism 20 and the body portion 321 may be at the first fixed relative position, and the bone conductive speaker mechanism 20 may adhere to and fit with the back of the auricle. Therefore, when the user needs to use the bone conductive speaker mechanism 20, the bone conductive speaker mechanism 20 may be required to rotate for less than 90° to adhere to and fit with the back of the auricle. In addition, when the hinge 40 is in a first state of which the first support face 432 elastically abuts against the third support face 441, a certain angle may be defined between the hinge arm 43 and the bone conductive speaker mechanism 20 connected thereto. Therefore, when the user is wearing the eyeglasses, the hinge arm 43 and the connected bone conductive speaker mechanism 20 may be positioned at the back and face towards the user's ears, such that the eyeglasses may be held and fixed, and may not be fallen off from the user's head easily.

To be noted that, the angle $\omega_3$ between the first support face 432 and the second support face 433 may be determined according to actual demands. When the angle is excessively large, the angle between the hinge arm 43 and the hinge base 42 and an angle between the hinge base 42 and a functional member 20 connected to the end of the hinge arm 43 away from the hinge base 42 may be relatively small. Therefore, when the user is wearing the device, the hinge arm 43 and the bone conductive speaker mechanism 20 may be positioned excessively close to the user's ears and compress the ears, and the user may feel uncomfortable. When the angle is excessively small, according to one aspect, the user need to drive the bone conductive speaker mechanism 20 for an excessively large angle when driving the bone conductive speaker mechanism 20 to move from the first relative position to the second relative position, and it may be inconvenient for the user to use the device; and according to another aspect, the angle between the body portion 321 and bone conductive speaker mechanism 20 and the angle between the hinge 40 and the bone conductive speaker mechanism 20 may be relatively small, and the eyeglasses may not be held or fixed. Therefore, when the user is wearing the eyeglasses, the eyeglasses may be fallen off from the front of the user's head easily. To be specific, the angle between the first support face 432 and the second support face 433 may be determined based on the head shape of the user.

To be specific, in an embodiment, on the cross-sectional plane perpendicular to the central axis of the hinge shaft 41, the angle W3 between the first support face 432 and the second support face 433 may be between 100° and 120°, and may specifically be 100°, 110°, 120°, and the like. Based on the determined angle, when the user is wearing the eyeglasses and sets the bone conductive speaker mechanism 20 at the first fixed relative position relative to the body portion 321, the bone conductive speaker mechanism 20 may not be excessively close to the user's ears to cause any uncomfortable feeling. When switching the bone conductive speaker mechanism 20 between the two relative positions relative to the body portion 321, the hinge may not be rotated by an excessively large angle, such that the user may use the device conveniently.

When the third support face 441 elastically abutting against one of the first support face 432 and the second support face 433 is switched into the third support face 441 elastically abutting against the other one of the first support face 432 and the second support face 433, the connective position 434 between the first support face 432 and the second support face 433 may abut against the third support face 441, and the supportive member 44 may be driven to resist against the elastic offsetting applied by the elastic member 45 and move away from the hinge arm 43. Taking the third support face 441 elastically abutting against the first support face 432 before the state switching as an example, when the state switching is initialized, the first support face 432 may depart away from the third support face 441 gradually, and at the same time, the connective position 434 abuts against the third support face 441 gradually. When the state is switching, the connective position 434 may slide from a side of the third support face 441 to another side of the third support face 441. At last, the state may be transitioned into the second support face 433 elastically abutting against the third support face 441. When the state is switching, the connective position 434 may abut against the third support face 441 mutually at all time, and a shape of the connective position 434 may affect a process of state switching. For example, when the first support face 432 and the second support face 433 are connected through a line, the connective position 434 may have a relatively sharp corner. When the user drive the hinge base 42 and/or the hinge arm 43 to switch states for the hinge 40, according to one aspect, a relatively low level of buffer may be applied to switching from the connective position 434 abutting against the third support face 441 into the connective position 434 abutting against the first support face 432 and the second support face 433, and the state switching may be abrupt, user may have an unideal feeling about driving the hinge 40; and according to another aspect, the connective position 434 may be relatively sharp, and the third support face 441 may be abraded after the state switching being repeatedly performed.

In an embodiment of the present disclosure, on the cross-sectional plane perpendicular to the central axis of the hinge shaft 41, the connective position 434 may be curved, such that the first support face 432 and the second support face 433 may be connected through a curved face. When a state of the hinge 40 is being switched, the connective position 434 abutting against the third support face 441 may be relatively smooth, such that the user may have an ideal feeling about driving the hinge 40, and the abrasion of the third support face 441 may be reduced after the state switching being repeatedly performed.

To be specific, in an embodiment, the connective position 434 may be configured to be an arc having varied curvatures, which may generate various effects. A value of a curvature may be determined based on actual needs. In the present embodiment, the curvature of the arc may be set to be in a range of 5 to 30, and may specifically be 5, 10, 15, 20, 25, 30, and the like, which will not be limited to the present disclosure.

To be noted that, in the present embodiment, the curvature of arc of the connective position 434 may enable the user to have a satisfied feeling when driving the hinge 40 to allow the bone conductive speaker mechanism 20 to switch between the first fixed relative position and the second fixed relative position relative to the body portion 321.

In an embodiment, the third support face 441 may be configured to require different forces to switch from the third support face 441 elastically abutting against the first support face 432 into the third support face 441 elastically abutting against the second support face 433 and to switch from the third support face 441 elastically abutting against the second support face 433 to the third support face 441 elastically abutting against the first support face 432.

To be noted that, switching states of the hinge 40 may drive the bone conductive speaker mechanism 20 to switch between the first fixed relative position relative to the body portion 321 and the second fixed relative position relative to the body portion 321. Correspondingly, the two fixed relative positions may correspond to the bone conductive speaker mechanism 20 being in use and the bone conductive speaker mechanism 20 being not in use respectively. When the user is wearing the eyeglasses, difficulty of a user's hand applying a force at a back of the head to switch the first fixed relative position into the second fixed relative position is difference from difficulty of the user's hand applying the force at the back of the head to switch the second relative position into the first fixed relative position. Therefore, the device is configured to require different external forces corresponding to switching between different states, allowing the user to use the device easily.

To be specific, in an embodiment, the third support face 441 elastically abutting against the first support face 432 being switched into the third support face 441 elastically abutting against the second support face 433 may correspond to the bone conductive speaker mechanism 20 at the second fixed relative position relative to the body portion 321 being switched into the bone conductive speaker mechanism 20 at the first fixed relative position relative to the body portion 321 to adhere to and fit with the back of the auricle.

Further, in the present embodiment, the external force applied to the third support face 441 to enable the third support face 441 elastically abutting against the first support face 432 to be switched into the third support face 441 elastically abutting against the second support face 433 may be less than the external force applied to the third support face 441 to enable the third support face 441 elastically abutting against the second support face 433 to be switched into the third support face 441 elastically abutting against the first support face 432.

When using the bone conductive speaker mechanism 20, the third support face 441 elastically abutting against the first support face 432 may be required to be switched into the third support face 441 elastically abutting against the second support face 433. When the bone conductive speaker mechanism 20 is not in use, the third support face 441 elastically abutting against the second support face 433 may be required to be switched into the third support face 441 elastically abutting against the first support face 432. According to the present embodiment, the force that the user may apply to allow the bone conductive speaker mechanism 20 to be in use is less than the force that the user may apply to allow the bone conductive speaker mechanism 20 to be not in use. Therefore, it may be convenient for the user to use functions of the bone conductive speaker mechanism 20.

To be specific, further referring to FIGS. 34 and 36, in an embodiment, when the third support face 441 elastically abutting against the first support face 432 is switched into the third support face 441 elastically abutting against the second support face 433, the connective position 434 may initially contact a first position 4411 of the third support face 441. When the third support face 441 elastically abutting against the second support face 433 is switched into the third support face 441 elastically abutting against the first support face 432, the connective position 434 may contact a second position 4412 of the third support face 441. On the cross-sectional plane perpendicular to the central axis of the hinge shaft 41, a contact point may be defined between the elastic member 45 and the supportive member 44, and a distance $d_1$ between the first position 4411 and the contact point along an elastic offsetting direction of the elastic member 45 may be less than a distance $d_2$ between the second position 4412 and the contact point along the elastic offsetting direction.

To be noted that, when the third support face 441 elastically abuts against the first support face 432, the connective position 434 may be arranged at a position close to an end of the third support face 441. When the third supportive face 441 elastically abuts against the second support face 443, the connective position 434 may be arranged at a position close to another end of the third support face 441. Therefore, the first position 4411 and the second position 4412 may be at two ends of the third support face 441. In other words, in the present embodiment, a distance between a position close to the end of the third support face 441 of the supportive member 44 and the contact point may be different from a distance between a position close to another end of the third support face 441 of the supportive member 44 and the contact point along the elastic offsetting direction of the elastic member 45, and the distance corresponding to the second position 4412 may be less than the distance corresponding to the first position 4411. Under such the situation, when the third support face 441 elastically abutting against the first support face 432 is switched into the third support face 441 elastically abutting against the second support face 433, the connective position 434 may not initially abut against the third support face 441 and may not receive the elastic force applied from the elastic member 45, but may gradually abut against the third support face 441 and gradually receive the elastic force applied from the elastic member 45. When the third support face 441 elastically abutting against the first support face 432 is switched into the third support face 441 elastically abutting against the second support face 433, the connective position 434 may initially abut against the third support face 441 and receive the elastic force applied by the elastic member 45. Alternatively, even when comparing to the third support face 441 elastically abutting against the second support face 433 being switched into the third support face 441 elastically abutting against the first support face 432, the connective position 434 may receive the elastic force applied from the elastic member 45 at an earlier stage when the third support face 441 elastically abutting against the first support face 432 is switched into the third support face 441 elastically abutting against the second support face 433. Therefore, under such the situation, a relatively small force may be required to switch the hinge 40 elastically abutting against the first support face 432 into the hinge 40 elastically abutting against the second support face 433. In such a way, when the user is using the bone conductive speaker mechanism 20, the user may apply a relatively small force to drive the bone conductive speaker mechanism 20, and it may be convenient for the user to use the device.

Further, the third support face 441 may include a first sub-support face 4413 and a second sub-support face 4414. The first position 4411 may be defined on the first sub-support face 4413, and the second position 4412 may be defined on the second sub-support face 4414. That is, the first sub-support face 4413 and the second sub-support face 4414 may be arranged close to the two ends of the third support face 441.

The second sub-support face 4414 may be a flat face. To be specific, when the first support face 432 or the second support face 433 elastically abuts against the third support face 441, the second sub-support face 4414 may be parallel to the first support face 432 or the second support face 433. The first sub-support face may be a flat face or a curved face, which will not be limited by the present disclosure.

Further, the first sub-support face 4413 and the second sub-support face 4414 may not be arranged on a same plane. The first sub-support face 4413 may be inclined to the second sub-support face 4414, and an angle between the first sub-support face 4413 and the second sub-support face 4414 may be less than or equal to 10°, such as may be less than or equal to 2°, 4°, 6°, 8°, 10°, and the like. To be specific, the first sub-support face 4413 may be arranged to face a direction away from the hinge arm 43, such that, on the cross-sectional plane perpendicular to the central axis of the hinge shaft 41, the distance between the first position 4411 and the contact point between the elastic member 45 and the supportive member 44 along the elastic offsetting direction of the elastic member 45 may be less than the distance between the second position 4412 and the contact point along the elastic offsetting direction. When the first sub-support face 4413 is the curved, and the second sub-support face 4414 is the flat, the angle between the first sub-support face 4413 and the second sub-support face 4414 may be an angle between a plane tangent to the first sub-support face 4413 and the second sub-support face 4414 at an intersection between the first sub-support face 4413 and the second sub-support face 4414.

Figure 37:
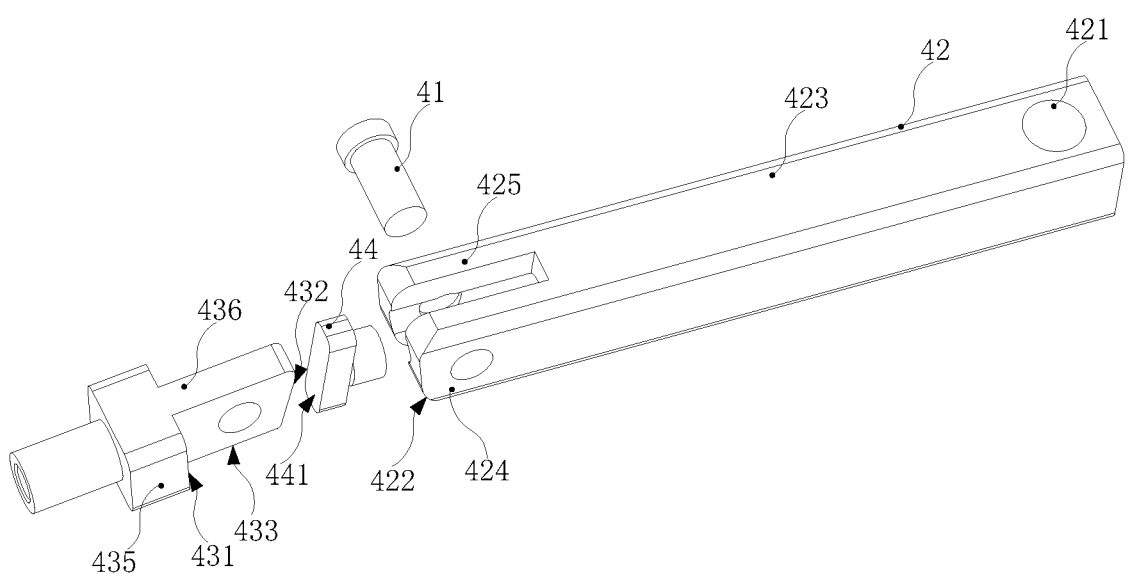
FIG. 37 is an exploded perspective view of a portion of a bone conductive sound generating device according to an embodiment of the present disclosure.

Further referring to FIG. 37, in an embodiment, the hinge base 42 may include a base body 423, a fourth ledge 424, and a fifth ledge 425. The fourth ledge 424 and the fifth ledge 425 may protrude from the base body 423 and may be spaced apart from each other. That is, a gap may be defined between the fourth ledge 424 and the fifth ledge 425. The hinge arm 43 may include an arm body 435 and a sixth ledge 436 protruding from the arm body 435. The sixth ledge 436 may be inserted into the gap, and may be rotatably connected to the fourth ledge 424 and the fifth ledge 425 through the hinge shaft 41. The first support face 432 and the second support face 433 may be arranged on the sixth ledge 436. The supportive member 44 may be at least partially received in the gap and may be arranged on a side of the sixth ledge 436 facing the base body 423. The base body 423 may define a receiving chamber 4231 fluidly coupled to the gap. The elastic member 45 may be received in the receiving chamber 4231, and may offset the supportive member 44 towards the sixth ledge 436.

To be specific, a first through hole, a second through hole, and a third through hole may be defined in the fourth ledge 424, the fifth ledge 425, and the sixth ledge 436, and the first through hole, the second through hole, and the third through hole may extend along a same axial direction. An inner diameter of each of the three through holes may be greater than or equal to the outer diameter of the hinge shaft 41, such that when the hinge shaft 41 is inserted and extends through the through holes, the hinge base 42 arranged with the fourth ledge 424 and the fifth ledge 425 may be rotatably connected to the hinge arm 43 arranged with the sixth ledge 436.

The first support face 432 and the second support face 433 are arranged on the sixth ledge 436 and parallel to the central axis of the hinge shaft 41, such that when the hinge arm 43 rotates relative to the hinge base 42 around the hinge shaft 41, the first support face 432 and the second support face 433 may be received in the gap between the fourth ledge 424 and the fifth ledge 425.

Further, the supportive member 44 may be positioned between the fourth ledge 424 and the fifth ledge 425 of the base body 423, and the third support face 441 of the supportive member 44 may be arranged to face towards the sixth ledge 436. In an embodiment, the elastic member 45 may be completely received in the receiving chamber 4231, and a side of the elastic member 45 facing the gap between the fourth ledge 424 and the fifth ledge 425 may contact the supportive member 44. When the elastic member 45 is in a natural state, a region of the supportive member 44 close to the elastic member 45 may be at least partially received in the receiving chamber 4231. To be noted that, a portion of the supportive member 44 received in the receiving chamber 4231 may have a shape fitting with the receiving chamber 4231. Therefore, when the elastic member 45 elastically offset the supportive member 44, the portion of the supportive member 44 received in the receiving chamber 4231 may stably slide along and inside the receiving chamber 4231.

In an embodiment, on the cross-sectional plane perpendicular to the hinge base 42, an area of a cross section of the receiving chamber 4231 taken along the cross-sectional plane may be less than an area of a cross section of the gap between the fourth ledge 424 and the fifth ledge 425 taken along the cross-sectional plane. A shape of a portion of the supportive member 44 arranged out of the receiving chamber 4231 may fit with the gap between the fourth ledge 424 and the fifth ledge 425. In such a way, when the supportive member 44 moves towards the elastic member 45, the supportive member 44 may not be completely received into the receiving chamber 4231.

Of course, in other embodiments, on the cross-sectional plane perpendicular to the hinge base 42, a shape of the cross section of the receiving chamber 4231 taken along the cross-sectional plane may be the same as a shape of the cross section of the gap between the fourth ledge 424 and the fifth ledge 425 taken along the cross-sectional plane. Under such the situation, the supportive member 44 may be completely received in the receiving chamber 4231, such that the supportive member 44 may slide along and inside the receiving chamber 4231 when the supportive member 44 is being pushed.

Further, the first end face 422 of the hinge base 42 may be an end face of the fourth ledge 424 and the fifth ledge 425 facing towards the hinge arm 43. The sixth ledge 436 arranged on and protrude from the arm body 435 may be received in the gap between the fourth ledge 424 and the fifth ledge 425, such that the first end face 422 of the fourth ledge 424 and the fifth ledge 425 may be arranged to face the arm body 435. On the cross-sectional plane perpendicular to the central axis of the hinge shaft 41, a second end face 431 may be arranged on the arm body 435 protruding from the sixth ledge 436 and facing the fourth ledge 424 and the fifth ledge 425 of the hinge base 42.

In the present embodiment, when the hinge arm 43 and the hinge base 42 rotating relative to each other, a gap between the first end face 422 of the fourth ledge 424 and the fifth ledge 425 and the second end face 431 of the arm body 435 may be greater than or less than the diameter of the second connection thread 60 at all time. In such a way, the second connection thread 60 may not be clamped between the arm body 435 and the fourth ledge 424 or between the arm body 435 and the fifth ledge 425 when the hinge base 42 and the hinge arm 43 rotate relative to each other, reducing a damage to the second connection thread 60 caused by the hinge 40.

In an embodiment, the gap between the first end face 422 of the arm body 435 and the second end face 431 of the fourth ledge 424 and the fifth ledge 425 may always be significantly greater than or significantly less than the diameter of the second connection thread 60 when the hinge arm 43 and the hinge base 42 are rotating relative to each other, such that the damage to the second connection thread 60 caused by the hinge 40 may further be reduced.

To be noted that, in the present embodiment, the gap between the first end face 422 and the second end face 431 may be even and have a uniform size to satisfy the above-mentioned condition of the gap being greater than or less than the diameter of the second connection thread 60. Alternatively, in another embodiment, a gap between a region of the first end face close to the second connection thread 60 and a region of the second end face close to the second connection thread 60 may be greater than or less than the diameter of the second connection thread 60, and other regions of the first and the second end faces may not be required to meet the above-mentioned condition.

To be specific, in an embodiment, on the cross-sectional plane perpendicular to the central axis of the hinge shaft 41, at least one of the end face of the fourth ledge 424 and the fifth ledge 425 facing the hinge arm 43 and the end face of the arm body 435 facing the hinge base 42 may be chamfered, such that when the hinge arm 43 and the hinge base 42 are rotating relative to each other, a region of the gap therebetween close to the second connection thread 60 may be greater than the diameter of the second connection thread 60 at all time.

Chamfering the end faces may generate a round corner or may cut the end faces directly.

In the present application scenario, at least one of the end face of the fourth ledge 424 and the fifth ledge 425 facing the hinge arm 43 and the end face of the arm body 435 facing the hinge base 42 may be chamfered, such that when the hinge arm 43 and the hinge base 42 are rotating relative to each other, the second connection thread 60 may not be clamped into the gap between the two end faces.

The above description may only be embodiments of the present disclosure, without limiting the scope of the present disclosure. Any equivalent structural or process transformation performed based on the specification and the drawings of the present disclosure, applied directly or indirectly in other related art, should also be included within the scope of the present disclosure.

What is claimed is:

1. A bone conductive sound generating device, comprising:
   a fixing mechanism comprising a rim, a first arm, and a second arm, wherein the first arm and the second arm are connected to two opposite sides of the rim;
   a first bone conductive speaker mechanism, connected to an end of the first arm away from the rim; and
   a first connection member, configured to connect the first bone conductive speaker mechanism to the first arm such that the first bone conductive speaker mechanism is capable of moving from a first fixed position relative to the first arm to a second fixed position relative to the first arm through the first connection member;
   a rotational shaft assembly, configured to connect the rim with the first arm,
   wherein the rotational shaft assembly comprises a first rotational shaft, an end of the first rotational shaft is fixedly connected to one of the rim and the first arm, the other end of the first rotational shaft is rotatably connected to the other one of the rim and the first arm, such that the rim and the first arm are rotatable relative to each other around the rotational shaft assembly;
   the first rotational shaft defines a thread channel along an axial direction of the first rotational shaft, two end faces of the first rotational shaft define two thread openings being fluidly coupled to an external environment, the thread channel is defined to be fluidly coupled to the two thread openings to further be fluidly coupled to the external environment, and the two end faces are two axial ends of the first rotational shaft that are oriented along the axial direction of the first rotational shaft;
   wherein when the first bone conductive speaker mechanism is in the first fixed position relative to the first arm, a first angle is defined between the first bone conductive speaker mechanism and the first arm; and
   when the first bone conductive speaker mechanism is in the second fixed position relative to the first arm, a second angle is defined between the first bone conductive speaker mechanism and the first arm, wherein the first angle is less than the second angle.

2. The bone conductive sound generating device according to claim 1, wherein
   the first bone conductive speaker mechanism comprises a fitting face;
   the fitting face comprises a protruded curved face configured to adhere to and fit with a predefined region of a back of an auricle of a user, a curvature of the curved face is less than or equal to 1, an area of the curved face is less than or equal to 0.5 cm$^2$ or 1.0 cm$^2$, and a center of the predefined region of the back of the auricle faces directly a crus of helix.

3. The bone conductive sound generating device according to claim 2, further comprising a first hinge configured to connect the end of the first arm away from the rim with the first connection member, wherein the hinge comprises:
   a first hinge base, connected to the end of the first arm away from the rim;
   a first hinge shaft;
   a first hinge arm, wherein an end of the first hinge arm is rotatably connected to the first hinge base through the first hinge shaft and the other end of the first hinge arm is connected to an end of the first connection member away from the first bone conductive speaker mechanism, such that the first connection member and the first bone conductive speaker mechanism is rotatable relative to the first arm to allow the first bone conductive speaker mechanism to be arranged at the first fixed position or the second fixed position relative to the first arm.

4. The bone conductive sound generating device according to claim 3, further comprising a second hinge, wherein
   the second hinge is configured to connect to the second arm and comprises a second hinge shaft;
   the first hinge shaft has a first central point, the second hinge shaft has a second central point, and a hinge shaft connection line is defined between the first central point and the second central point;
   a ratio of a distance between the first central point and a central point of the fitting face to a vertical distance between a symmetrical central point of the rim and the hinge shaft connection line is in a range of 0.1 to 1.5.

5. The bone conductive sound generating device according to claim 3, wherein
   the first hinge arm comprises a first support face and a second support face, arranged at an end of the first hinge arm close to the first hinge base, and the first support face and the second support face are adjacent to each other;
   the first hinge further comprises a supportive member and an elastic member, the supportive member is movably arranged with the first hinge base and comprises a third support face, and the elastic member is configured to apply an elastic force to the supportive member to elastically offset the supportive member towards the first hinge arm, wherein
   when the first bone conductive speaker mechanism is in the first fixed position relative to the first arm, the second support face is configured to elastically abut against the third support face, and the first bone conductive speaker mechanism is configured to adhere to and fit with the back of the auricle;
   the first support face is configured to elastically abut against the third support face when the first bone conductive speaker mechanism is in the second fixed position relative to the first arm; and
   when the first bone conductive speaker mechanism is transitioned between the first fixed position and the second fixed position relative to the first arm, a connective position between the first support face and the second support face is configured to elastically abut against the third support face to resist against the elastic force applied by the elastic member.

6. The bone conductive sound generating device according to claim 5, wherein
a cross-sectional plane of the first hinge shaft is perpendicular to a central axis of the first hinge shaft; and
a ratio of a maximum distance between the first hinge shaft and the connective position on the cross-sectional plane to a minimum distance between the first hinge shaft and the first support face is in a range of 1.1 to 1.5.

7. The bone conductive sound generating device according to claim 1, further comprising a second connection member, wherein
the first arm comprises a first body portion, arranged between and connected with the rim and the first connection member, the second arm comprises a second body portion, arranged between and connected with the rim and the second connection member;
a top surface of the first body portion and a top surface of the second body portion are on a reference horizontal plane;
the first connection member comprises a first portion and a second portion, the first portion and the second portion are symmetrical about a symmetrical plane;
the rim comprises a first sub-rim and a second sub-rim, the first sub-rim and the second sub-rim are symmetrical about a rim symmetrical plane;
an angle between the symmetrical plane and the reference horizontal plane is in a range of 65° to 85° when the first bone conductive speaker mechanism is in the first fixed position relative to the first arm; and
an angle between the symmetrical plane and a rim symmetrical plane is in a range of 5° to 30° when the first bone conductive speaker mechanism is in the first fixed position relative to the first arm.

8. The bone conductive sound generating device according to claim 1, wherein the first arm defines a first chamber, and a functional component is received in the first chamber, the second arm defines a second chamber, and another functional component is received in the second chamber, and the bone conductive sound generating device further comprises:
a first connection thread, configured to electrically connect the functional component received in the first arm and the another functional component received in the second arm;
wherein the first connection thread is received in the thread channel, an end of the first connection thread extends along the thread channel to reach the rim through one of the two thread openings, and the other end of the first connection thread extends along the thread channel to reach the first arm through the other one of the two thread openings.

9. The bone conductive sound generating device according to claim 8, wherein the rotational shaft assembly further comprises a second rotational shaft, the second rotational shaft is configured spaced apart from the first rotational shaft, the first and the second rotational shafts are coaxial;
the rim comprises a first ledge;
the first arm comprises a second ledge and a third ledge, the second ledge and the third ledge are configured at an end of the first arm close to the rim and are spaced apart from each other;
an end of the first rotational shaft close to the second rotational shaft and an end of the second rotational shaft close to the first rotational shaft are connected to two opposite ends of the first ledge, an end of the first rotational shaft away from the second rotational shaft is connected to the second ledge, and an end of the second rotational shaft away from the first rotational shaft is connected to the third ledge, such that the first ledge is configured between the second ledge and the third ledge.

10. The bone conductive sound generating device according to claim 9, wherein the two thread openings comprise:
a first thread opening, defined on an end face of the first rotational shaft close to the second rotational shaft; and
a second thread opening, defined on a side wall of the first rotational shaft close to the second ledge,
wherein the first rotational shaft is rotatably connected to the first ledge through the end face defining the first thread opening and fixedly connected to the second ledge through the side wall defining the second thread opening.

11. The bone conductive sound generating device according to claim 9, wherein
the first ledge defines a first receiving hole, the second ledge defines a second receiving hole, the first receiving hole and the second receiving hole are coaxial;
the first rotational shaft is configured to be received in the first receiving hole and the second receiving hole; and
an outer wall of the first rotational shaft has an interference fit with an inner wall of the second receiving hole, and a gap is defined between the outer wall of the first rotational shaft and an inner wall of the first receiving hole.

12. The bone conductive sound generating device according to claim 9, wherein
the first ledge defines a third receiving hole, the third ledge defines a fourth receiving hole, the third receiving hole and the fourth receiving hole are coaxial;
the second rotational shaft is configured to be received in the third receiving hole and the fourth receiving hole; and
an outer wall of the second rotational shaft has an interference fit with an inner wall of the third receiving hole, and a gap is defined between the outer wall of the second rotational shaft and an inner wall of the fourth receiving hole, or has an interference fit with the inner wall of the fourth receiving hole, and a gap is defined between the outer wall of the second rotational shaft and the inner wall of the third receiving hole.

13. The bone conductive sound generating device according to claim 1, further comprising:
a second bone conductive speaker mechanism, connected to an end of the second arm away from the rim; and
a second connection member, configured to connect the second bone conductive speaker mechanism to the second arm such that the second bone conductive speaker mechanism is capable of moving from a first fixed position relative to the second arm to a second fixed position relative to the second arm through the second connection member;
wherein when the second bone conductive speaker mechanism is in the first fixed position relative to the second arm, a third angle is defined between the second bone conductive speaker mechanism and the second arm; and
when the second bone conductive speaker mechanism is in the second fixed position relative to the second arm, a fourth angle is defined between the second bone conductive speaker mechanism and the second arm, wherein the third angle is less than the fourth angle.

14. A head-mounted earphone, comprising:
a frame, comprising a rim, a first arm, a second arm, and a rotational assembly, wherein the rotational assembly is configured to connect the first arm and the second arm to two opposite ends of the rim;
a first speaker assembly, comprising a first connection member and a first speaker mechanism connected with each other;
a second speaker assembly, comprising a second connection member and a second speaker mechanism connected with each other;
a first hinge, configured to connect an end of the first connection member away from the first speaker mechanism to an end of the first arm away from the rim; and
a second hinge, configured to connect an end of the second connection member away from the second speaker mechanism to an end of the second arm away from the rim, wherein
  a distance between the end of the first connection member away from the first speaker mechanism and the end of the first arm away from the rim is adjustable via the first hinge;
  when the first hinge is in a first state, the first speaker mechanism is in a first fixed position relative to the first arm, and a first distance is defined between the end of the first connection member away from the first speaker mechanism and the end of the first arm away from the rim;
  when the first hinge is in a second state, the first speaker mechanism is in a second fixed position relative to the first arm, and a second distance is defined between the end of the first connection member away from the first speaker mechanism and the end of the first arm away from the rim, wherein the first distance is less than the second distance;
wherein the frame further comprises a rotational shaft assembly, configured to connect the rim with the first arm,
wherein the rotational shaft assembly comprises a first rotational shaft, an end of the first rotational shaft is fixedly connected to one of the rim and the first arm, the other end of the first rotational shaft is rotatably connected to the other one of the rim and the first arm, such that the rim and the first arm are rotatable relative to each other around the rotational shaft assembly;
the first rotational shaft defines a thread channel along an axial direction of the first rotational shaft, two end faces of the first rotational shaft define two thread openings being fluidly coupled to an external environment, the thread channel is defined to be fluidly coupled to the two thread openings to further be fluidly coupled to the external environment, and the two end faces are two axial ends of the first rotational shaft that are oriented along the axial direction of the first rotational shaft.

15. The head-mounted earphone according to claim 14, wherein
the first arm comprises a first body portion, arranged between and connected with the rim and the first connection member, the second arm comprises a second body portion, arranged between and connected with the rim and the second connection member;
a top surface of the first body portion and a top surface of the second body portion are on a reference horizontal plane;
the first connection member comprises a first portion and a second portion, the first portion and the second portion are symmetrical about a symmetrical plane;
the rim comprises a first sub-rim and a second sub-rim, the first sub-rim and the second sub-rim are symmetrical about a rim symmetrical plane;
an angle between the symmetrical plane and the reference horizontal plane is in a range of 65° to 85° when the first speaker mechanism is in the first fixed position relative to the first arm; and
an angle between the symmetrical plane and the rim symmetrical plane is in a range of 5° to 30° when the first speaker mechanism is in the first fixed position relative to the first arm.

16. The head-mounted earphone according to claim 14, wherein the first arm defines a first chamber, and a functional component is received in the first chamber, the second arm defines a second chamber, and another functional component is received in the second chamber, and the head-mounted earphone further comprises a first connection thread configured to electrically connect the functional component received in the first arm and the another functional component received in the second arm; and
the first connection thread is received in the thread channel, an end of the first connection thread extends along the thread channel to reach the rim through one of the two thread openings, and the other end of the first connection thread extends along the thread channel to reach the first arm through the other one of the two thread openings.

17. The head-mounted earphone according to claim 14, wherein the first hinge comprises:
a first hinge base, connected to the end of first arm away from the rim;
a first hinge shaft;
a first hinge arm, wherein an end of the first hinge arm is rotatably connected to the first hinge base through the first hinge shaft and the other end of the first hinge arm is connected to the end of the first connection member away from the first speaker mechanism, such that the first connection member and the first speaker mechanism are rotatable relative to the first arm to allow the first speaker mechanism to be arranged in the first fixed position relative to the first arm or the second fixed position relative to the first arm.

18. The head-mounted earphone according to claim 17, wherein the first hinge arm comprises a first support face and a second support face, arranged at an end of the first hinge arm close to the first hinge base, and the first support face and the second support face are adjacent to each other;
the first hinge further comprises a supportive member and an elastic member, the supportive member is movably arranged with the first hinge base and comprises a third support face, and the elastic member is configured to apply an elastic force to the supportive member to elastically offset the supportive member towards the first hinge arm, wherein
the second support face is configured to elastically abut against the third support face when the first speaker mechanism is in the first fixed position relative to the first arm, and the first speaker mechanism is configured to adhere to and fit with a back of an auricle when the first bone conductive speaker mechanism is in the first fixed relative position relative to the first arm;
the first support face is configured to elastically abut against the third support face when the first speaker mechanism is in the second fixed position relative to the first arm; and when the first bone conductive speaker mechanism is transitioned between the first fixed position and the second fixed position relative to the first arm, a connective position between the first support face and the second support face is configured to elastically abut against the third support face to resist against the elastic force applied by the elastic member.

19. The head-mounted earphone according to claim 18, wherein
the first hinge shaft has a cross-sectional plane perpendicular to a central axis of the first hinge shaft; and
a ratio of a maximum distance between the first hinge shaft and the connective position on the cross-sectional plane to a minimum distance between the first hinge shaft and the first support face is in a range of 1.1 to 1.5.

20. A bone conductive speaker assembly, comprising: a connection member and a bone conductive speaker mechanism, wherein
an end of the connection member is connected to the bone conductive speaker mechanism, the other end of the connection member is capable of being electrically connected to an end of an arm of eyeglasses;
the bone conductive speaker mechanism has a protruded curved face, the protruded curved face is capable of adhering to and fitting with a predefined region of a back of an auricle of an ear; and
a center of the predefined region directly faces a crus of helix of the ear;
wherein the eyeglasses comprise: a rim, a first arm, a second arm, and a rotational shaft assembly, the first arm and the second arm are connected to two opposite sides of the rim, the rotational shaft assembly is configured to connect the rim with the first arm;
wherein the rotational shaft assembly comprises a first rotational shaft, an end of the first rotational shaft is fixedly connected to one of the rim and the first arm, the other end of the first rotational shaft is rotatably connected to the other one of the rim and the first arm, such that the rim and the first arm are rotatable relative to each other around the rotational shaft assembly;
the first rotational shaft defines a thread channel along an axial direction of the first rotational shaft, two end faces of the first rotational shaft define two thread openings being fluidly coupled to an external environment, the thread channel is defined to be fluidly coupled to the two thread openings to further be fluidly coupled to the external environment, and the two end faces are two axial ends of the first rotational shaft that are oriented along the axial direction of the first rotational shaft.

\* \* \* \* \*